(12) United States Patent
Sugita et al.

(10) Patent No.: US 7,297,432 B2
(45) Date of Patent: Nov. 20, 2007

(54) FUEL CELL AND FUEL CELL STACK

(75) Inventors: Narutoshi Sugita, Utsunomiya (JP); Yoshihiro Nakanishi, Kawachi-gun (JP); Hideaki Kikuchi, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 485 days.

(21) Appl. No.: 10/626,168

(22) Filed: Jul. 23, 2003

(65) Prior Publication Data

US 2005/0089745 A1  Apr. 28, 2005

Related U.S. Application Data

(63) Continuation-in-part of application No. 10/094,482, filed on Mar. 7, 2002, now Pat. No. 6,815,115.

(30) Foreign Application Priority Data

Jul. 24, 2002 (JP) .............................. P2002-215692

(51) Int. Cl.
  *H01M 2/02* (2006.01)
  *H01M 2/08* (2006.01)
  *H01M 2/14* (2006.01)
(52) U.S. Cl. .............................. 429/34; 429/35; 429/38; 429/39
(58) Field of Classification Search .................. 429/35, 429/34, 12, 38, 39
  See application file for complete search history.

(56) References Cited

U.S. PATENT DOCUMENTS

| 4,751,153 | A | 6/1988 | Roth |
| 5,232,792 | A * | 8/1993 | Reznikov ............... 429/14 |
| 5,424,144 | A | 6/1995 | Woods, Jr. |
| 5,464,700 | A | 11/1995 | Steck et al. |
| 6,040,076 | A | 3/2000 | Reeder |
| 6,261,711 | B1 | 7/2001 | Matlock et al. |
| 6,436,568 | B1 | 8/2002 | Schilling et al. |
| 6,599,653 | B1 | 7/2003 | Cummins et al. |
| 2002/0122970 | A1 | 9/2002 | Inoue et al. |

FOREIGN PATENT DOCUMENTS

| EP | 1152477 A2 | 11/2001 |
| JP | 08-148169 | 6/1996 |

OTHER PUBLICATIONS

European Search Report for Application No. 02004961.5-2119, dated May 10, 2006.

* cited by examiner

*Primary Examiner*—Patrick Joseph Ryan
*Assistant Examiner*—Helen Oi Kun Chu
(74) *Attorney, Agent, or Firm*—Lahive & Cockfield, LLP; Anthony A. Laurentano, Esq.

(57) ABSTRACT

The present invention provides a fuel cell comprising a pair of separators sandwiching outsides of a membrane electrode assembly composed of a pair of electrodes provided on both sides of a solid polymer electrolyte membrane, an outer seal member sandwiched by a pair of separators at a position surrounding an outer periphery of the membrane electrode assembly, an inner seal member sandwiched by one of the pair of separators and an outer periphery of the electrolyte membrane, and a backing member opposing to the inner seal member interposing the electrolyte membrane, wherein steps are formed at contact surfaces of the inner seal member and the outer seal member on one of the pair of separators.

11 Claims, 20 Drawing Sheets

FUEL CELL AND FUEL CELL STACK

RELATED APPLICATIONS

This application is a continuation-in-part of U.S. Ser. No. 10/094,482 filed on Mar. 7, 2002, now U.S. Pat. No. 6,815,115 which claims priority to Japanese Patent Application No. 2001-006745, filed on Mar. 9, 2001 in Japan. This application also claims priority to Japanese Patent Application No. 2002-215692 filed Jul. 24, 2002. The contents of the aforementioned applications are hereby incorporated by reference.

BACKGROUND OF THE INVENTION

1. Field of the Invention

The present invention relates to a solid polymer electrolyte membrane type fuel cell and to a fuel cell stack constituted by stacking a plurality of the fuel cell units, and more specifically, relates to a technique for absorbing expansion and contraction of the fuel cell stack in the stacking direction of separators.

2. Description of the Related Art

Fuel cells include a solid polymer electrolyte membrane type fuel cell constituted by providing a pair of electrodes on opposite sides of the solid polymer electrolyte membrane and sandwiching the outside thereof by a pair of separators.

In this fuel cell, a passage for a fuel gas (for example, hydrogen) is provided on the entire surface of a separator provided facing one electrode, a passage for an oxidant gas (for example, air including oxygen) is provided on the entire surface of a separator provided facing the other electrode, and a passage for a cooling medium is provided on either one of the surfaces of separators opposite to a surface facing the electrode.

When the fuel gas is supplied to the reaction surface of one electrode, hydrogen is ionized and moves to the other electrode via the solid polymer electrolyte membrane. Electrons generated during the reaction process are taken out to an external circuit, and are used as direct-current electrical energy.

Since the oxidant gas is supplied to the other electrode, the hydrogen ions, the electrons and the oxygen react with each other to thereby generate water.

The surface on the opposite side of the electrode reaction plane of the separator is cooled by the cooling medium flowing between the separators.

Since these reactant gases and the cooling medium should flow in respectively independent passages, a sealing technique, which separates each passage, is important.

The portions to be sealed include, for example, the peripheries of communication holes formed penetrating through the separator so as to distribute and supply the reactant gas and the cooling medium to each fuel cell unit in the fuel cell stack, the outer peripheries of membrane electrode assembly formed of the solid polymer electrolyte membrane and a pair of electrodes arranged on opposite sides thereof, the outer peripheries of a coolant passage plane of the separator, and the outer peripheries of front and back faces of the separator. As the sealing material, an elastic and adequately resilient material, for example, an organic rubber, is adopted.

Conventionally, a fuel cell having a membrane electrode assembly by sandwiching a solid polymer electrolyte membrane by a pair of electrodes and sandwiching the outside thereof by a pair of separators, comprises a membrane electrode assembly (as shown in FIG. 30) constituted by sandwiching a solid polymer electrolyte membrane having a larger outer size between a pair of gas diffusion layers each having the same size, and the outer size thereof is smaller than that of the solid polymer electrolyte membrane, as disclosed in Japanese Unexamined Patent Application, First Publication No. Hei 8-148169. In this type of fuel cell 40, the passage for the fuel gas 41 and the passage for the oxidant gas 42 are sealed by sandwiching with a pair of O-ring the portion of the solid polymer electrolyte membrane 45, which is protruded from the outer peripheries of the anode electrode 43 and the cathode electrode 44. However, in such a sealing structure, a problem arises in that sealing of passages may fail if a pair of O-rings each disposed on both side of the solid polymer electrolyte member are insufficiently aligned.

For example, as shown in FIG. 31, if two O-rings on both surface of the solid polymer electrolyte membrane are disposed out of positions, the pressure of both O-rings press the solid polymer membrane and the solid polymer electrolyte membrane 45 is be deformed such that the surface pressure of the O-rings becomes insufficient to provide a hermetic seal. In addition, an unfavorable phenomenon will be caused by deformation of the solid polymer electrolyte membrane in that the solid polymer electrolyte membrane will be peeled off from the anode electrode 43 and the cathode electrode 44.

In order to avoid such unfavorable phenomena, the grooves to align O-rings must be formed in a very precise manner, which results in increasing the manufacturing cost.

Since the fuel cell 40 is used as a fuel cell stack after stacking a plurality of fuel cell units, the thickness of the fuel cell unit is desired to be as thin as possible.

SUMMARY OF THE INVENTION

An object of the present invention is to solve the aforementioned problems and to provide fuel cell units and a fuel cell stack formed by stacking a plurality of fuel cell units, wherein those fuel cell units and a fuel cell stack have an improved sealability between the membrane electrode assembly and separators, a reduced cost, and an improved thickness in the direction of stacking.

In order to solve the above problems, the present invention is described in two groups of aspects. The first group includes the first embodiment and the second aspect includes embodiment from the second to the eighth embodiments. However, the present invention is not limited to one group and the two aspects can be combined.

In order to solve the above problems, the first aspect of the present invention provides a fuel cell which comprises a pair of separators (for example, a first separator 3 and a second separator 4 in the embodiment) sandwiching outsides of a membrane electrode assembly composed of a pair of electrodes provided on both sides of a solid polymer electrolyte membrane, an outer seal member sandwiched by a pair of separators at a position surrounding an outer periphery of the membrane electrode assembly, an inner seal member sandwiched by one (for example, the second separator 4 in the embodiment) of the pair of separators and an outer periphery of the electrolyte membrane, and a backing member (for example, an anode electrode in the embodiment) opposing to the inner seal member interposing the electrolyte membrane, wherein a step is formed at contact surfaces (a first plane portion 22 and a second plane portion 23 in the embodiment) of the inner seal member and the outer seal member on one of the pair of separators.

In the fuel cell according to the first aspect of the present invention, since the outer seal member surrounding the periphery of the membrane electrode assembly tightly seals a space between the first and second separators, and the inner seal member which is arranged at the outer periphery of the electrolyte membrane constituting the membrane electrode assembly at the inner side of the outer seal member tightly seals the space between the separator and the electrolyte membrane, the space between separators are separated on both side of the electrolyte membrane into two separated regions, one of which is located at the anode side and the other one is located at the cathode side.

Since the inner seal member and the second separator sandwiches the electrolyte membrane together with the backing member, the thin electrolyte membrane is reinforced by the backing member so that it can be protected from being deformed by a pressure through the inner seal member. In addition, since the electrolyte membrane is not deformed, the inner seal member is able to maintain sufficient surface pressure to attain the sufficient sealing ability.

In the above case, in contrast to the outer seal member tightly which seals the space between two separators, the inner seal member performs tight sealing between two separators including the electrolyte membrane and the backing member in between, so that a difference in thickness is generated between the inner seal member and the outer seal member. For example, even when the thickness of the inner seal member is set to a minimum thickness including a deformable portion for sealing, the thickness of the outer seal member which must seal a wider space than that for the inner seal member becomes excessively thick.

In both separators in contact with the outer seal member and the inner seal member, if the heights of the contact planes with both seal members are changed, that is, if a step is formed between respective contact planes, it becomes possible to reduce the thickness of the outer seal member, which results in reducing the material consumption of the seal member and reducing the product cost. In addition, since it is possible to reduce the thickness of the outer seal member while maintaining the necessary thickness for the inner seal member, it is possible to reduce the thickness of the fuel cell unit.

In a fuel cell according to the second aspect of the present invention, the anode electrode or the cathode electrode is used as the backing member of the electrolyte membrane.

According to the second aspect of the present invention, the fuel cell uses a backing member of the electrolyte membrane the anode electrode or the cathode electrode, without using a separate element.

Application of the anode electrode or the cathode electrode to the electrolyte membrane without using a separate element as the backing member makes it possible to reduce the number of parts in the fuel cell and to reduce the product cost.

According to the third aspect of the present invention, the present invention proposes to use the second separator as a backing member for reinforcing the electrolyte membrane.

Application of the second separator to the electrolyte membrane as the backing member without using a separate element makes it possible to reduce the number of parts in the fuel cell and to reduce the product cost.

The fourth to tenth aspects of the present invention propose a fuel cell stack, formed by stacking a plurality of fuel cells according to one among the first to the third aspects.

Since the thickness of the individual fuel cell is reduced as described above, the thickness of the fuel cell stack can be reduced by an amount corresponding to the reduced thickness for a fuel cell times the number of stacked fuel cells for forming the fuel cell stack.

The second group includes eight aspects from the eleventh to the eighteenth aspect. The eleventh aspect of the present invention provides a fuel cell comprised of an electrode assembly sandwiched between a pair of separators (for example, a first separator 103 and a second separator 104 in the embodiment) composed of an electrolyte membrane sandwiched between an anode electrode and a cathode electrode, and provided with an outer seal member sandwiched between a pair of separators at a position surrounding the outer periphery of the electrode assembly, an inner seal member sandwiched between one of the separators (for example, a second separator 104 in the embodiment) and the outer periphery of the electrolyte membrane, and a backing member (for example, an anode electrode 107 in the embodiment) in opposition to the inner seal member and interposing the electrolyte membrane, wherein there is a step between the contact surface (for example, an inner plane portion 135 in the embodiment) with the backing member and the contact surface (for example, outer plane portion 136 in the embodiment) with the outer seal member on one of the separators (for example, a first separator 103 in the embodiment) in opposition to the other separator.

In the fuel cell according to the eleventh aspect of the present invention, since the outer seal member surrounding the periphery of the electrode assembly tightly seals a space between the separators and the inner seal member arranged at the outer periphery of the electrolyte membrane constituting the electrode assembly at the inner side of the outer seal member tightly seals the space between one of the separators and the electrolyte membrane, the space between the separators is separated on both sides of the electrolyte membrane into a space on the anode electrode side and a space on the cathode electrode side.

In this case, in contrast to the outer seal member tightly sealing the space between the pair of separators directly, since the inner seal member tightly seals the space between the pair of separators while sandwiching the electrolyte membrane and backing member in between, a difference results in their thickness. For example, in the case the inner seal member is set to the minimum thickness that ensures the minimum required amount of deformation to achieve adequate sealing, the outer seal member, which must seal a wider space than that for the inner seal member, becomes excessively thick.

Therefore, in the separator that contacts the backing member, the thickness of the outer seal member can be reduced by making the height of the contact surface of the backing member and the height of the contact surface of the outer seal member different, namely by providing a step. As a result, the amount of material that composes the seal members can be decreased and costs can be reduced. In addition, since the thickness of the outer seal member can be reduced while maintaining the thickness of the inner seal member, the thickness of the fuel cell can be reduced. The assembly quality when the fuel cells are stacked is improved since the rigidity of the separators is increased as a result of providing the step. In this case, formation of the seal members becomes easier if the contact surfaces with both seal members on one of the separators are made to be flat.

According to the twelfth aspect of the present invention, the fuel cell comprises a step of the same orientation as the step of one of the separators (for example, inner plane portion 135 and outer plane portion 136 in the embodiment) on the contact surfaces with both seal members (for example, inner place section 122 and outer plane portion 123 in the embodiment) on the other separator.

In the above-described fuel cell of the present invention, since the fuel cell comprises on both separators that compose the fuel cell, the assembly quality when stacking the fuel cells is further improved since the rigidity of both separators is improved. In addition, since the orientation of the step of one of the separators is the same as the orientation of the step of the other separator, the space between the two separators can be maintained nearly constant, thereby allowing a reactive gas or cooling medium to flow smoothly between them.

In the fuel cell according to the thirteenth aspect of the present invention, in the above-described fuel cell, a peripheral reinforcing member (for example, a reinforcing member 137 in the embodiment) is provided on the surface of the electrolyte membrane on the side that contacts the inner seal member.

As described above, since the fuel cell further comprises a reinforcing member on the periphery of the surface of the electrolyte membrane on the side that contacts the inner seal, the electrolyte membrane can be further reinforced in the direction of thickness, thereby further improving its durability with respect to stress.

In the fourteenth aspect of the present invention, the present invention proposes a fuel cell wherein the backing member is the anode electrode or the cathode electrode.

According to the above-described fuel cell, since the backing member is also used as the anode electrode or cathode electrode arranged adjacent to the electrolyte membrane instead of being provided as a separate member, the number of parts can be decreased and the product cost can be reduced.

According to the fifteenth aspect of the present invention, the fuel cell comprises an integrated member which is integrally constituted by the inner seal member and the outer seal member.

According to the above-described aspect, since the inner seal member and outer seal member constitute an integral member, the number of parts can be decreased and the production time can be shortened.

In the sixteenth aspect of the present invention, the fuel cell comprises the outer seal member and the inner seal member as separate members.

According to the sixth aspect of the present invention, since the outer seal member and the inner seal member can be formed separately, the degree of freedom during handling is improved.

In the seventeenth aspect of the present invention, fuel cell comprises the outer seal member and the inner seal member on respective separators.

According to the above-described invention, the degree of freedom in handling is improved in the same manner as the invention described in the sixteenth aspect of the present invention.

The eighteenth aspect of the present invention provides a fuel cell stack which is formed by stacking a plurality of the fuel cells according to above described fuel cell.

According to the eighth aspect of the present invention, the assembly quality of the fuel cell stack is improved since the rigidity of the separators that compose the fuel cell is increased as previously described. In addition, the amount of material that composes the seal members can be decreased and costs can be reduced.

DETAILED DESCRIPTION OF THE INVENTION

Hereinafter, the scope of the present invention will be described below.

The first embodiment of the present invention will be described with reference to the attached drawings from FIG. 1 to FIG. 16.

Figure 1:
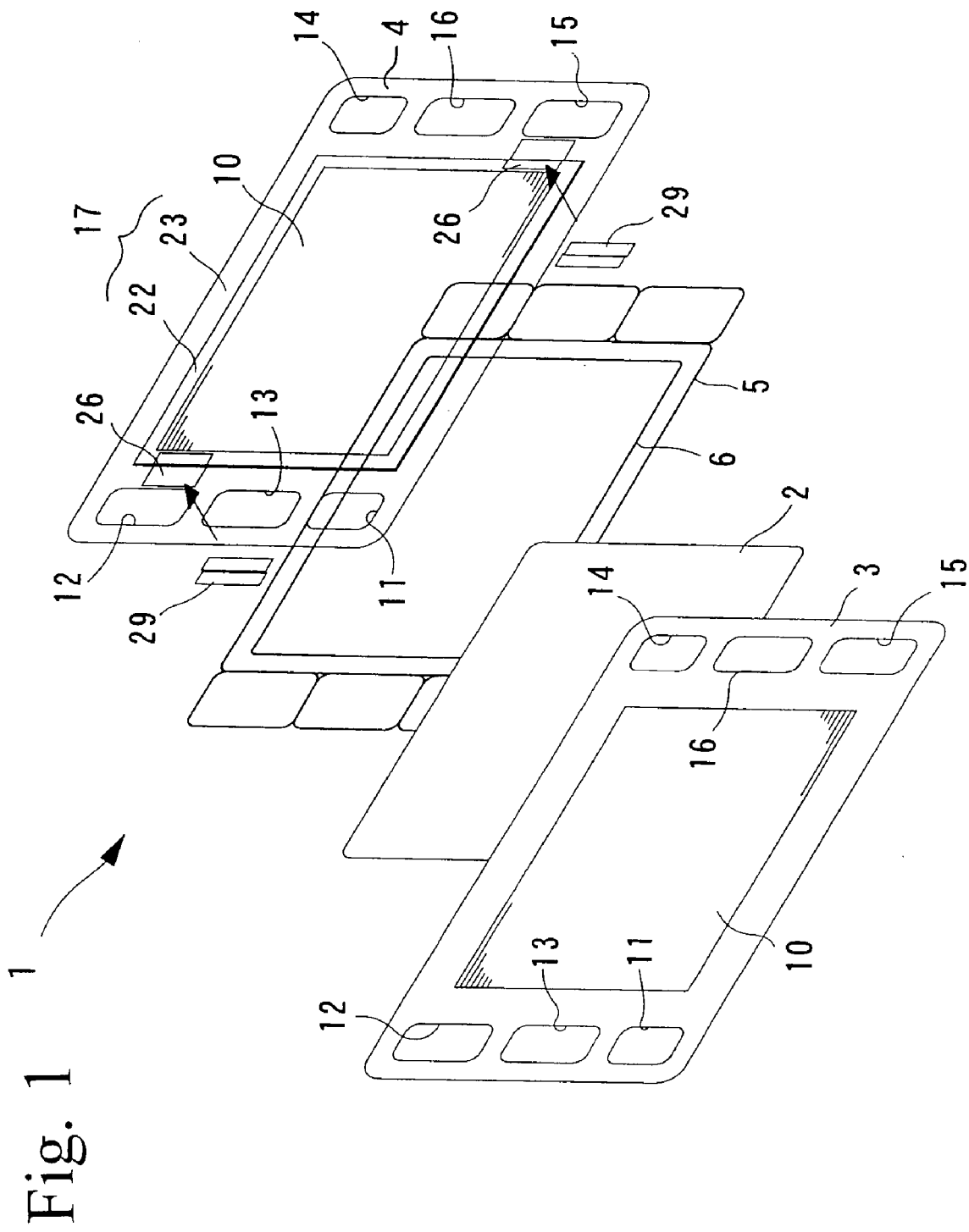
FIG. 1 is an exploded perspective view showing constituting elements of a fuel cell according to the first embodiment of the present invention.
Figure 2:
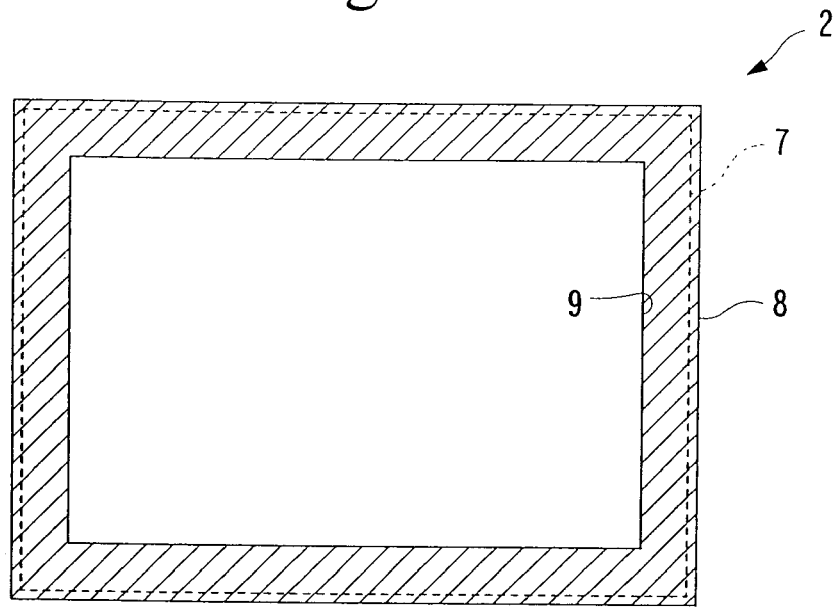
FIG. 2 is a plan view showing a membrane electrode assembly used in the fuel cell shown in FIG. 1.

A fuel cell according to the present embodiment is, as shown in FIG. 1, constructed by sandwiching a membrane electrode assembly 2 with a pair of separators (first separator 3 and second separator 4), by tightly sealing the space between the first separator 3 and the second separator 4 with an outer peripheral sealing member 5 so as to surround the membrane electrode assembly 2, and by tightly sealing the space between the second separator 4 and the membrane electrode assembly 2 with an inner peripheral sealing member 6.

The aforementioned membrane electrode assembly comprises a solid polymer electrolyte membrane 8 (hereinafter, abbreviated as electrolyte membrane), made of a perfluorosulfonate polymer, and an anode electrode 7 and a cathode electrode 9, which sandwich both surfaces of the electrolyte membrane 8.

The anode electrode 7 and cathode electrode 9 are constituted by, for example, laminating a catalyst layer made of a platinum alloy mainly formed by platinum, on a gas diffusion layer of the electrolyte membrane 8, wherein the gas diffusion layer is formed by a porous carbon cloth or a porous carbon paper.

The aforementioned electrolyte membrane 8 is formed as a rectangle and the anode electrode 7 is formed covering the total surface area of the electrolyte membrane or covering a larger area than the total area of the electrolyte membrane protruding from the edge of the electrolyte membrane 8. The cathode electrode 9 is formed in a smaller area than that of the anode electrode. These electrolyte membrane, anode electrode, and cathode electrode are formed such that the center of gravity of each element coincides and each element has the same dimensions from the edge of the electrolyte membrane. The anode electrode 7 thereby covers the entire surface of one surface of the electrolyte membrane 8 like a backing, and in contrast, the outer periphery of the other surface of the electrolyte membrane 8 is exposed and the inside of this surface is covered by the cathode electrode 9.

The aforementioned first separator 3 and the second separator 4, as shown in FIG. 1, comprise a corrugated sheet portion 10 in which a plurality of concave and convex portions having a certain height are formed in a certain pattern by press molding a stainless steel plate material having a plate thickness of from 0.2 to 0.5 mm; a fuel gas supply port 11, an oxidant gas supply port 12, a cooling medium supply port 13, a fuel gas exhaust port 14, an oxidant gas exhaust port 15, a cooling medium exhaust port 16 for supplying and exhausting the fuel gas (for example, hydrogen gas) and oxidant gas (for example, air containing oxygen) and the cooling medium (for example, water); and furthermore, a plane portion 17 is disposed so as to respectively surround these supply ports 11 to 13 and these exhaust ports 14 to 16.

Figure 3:
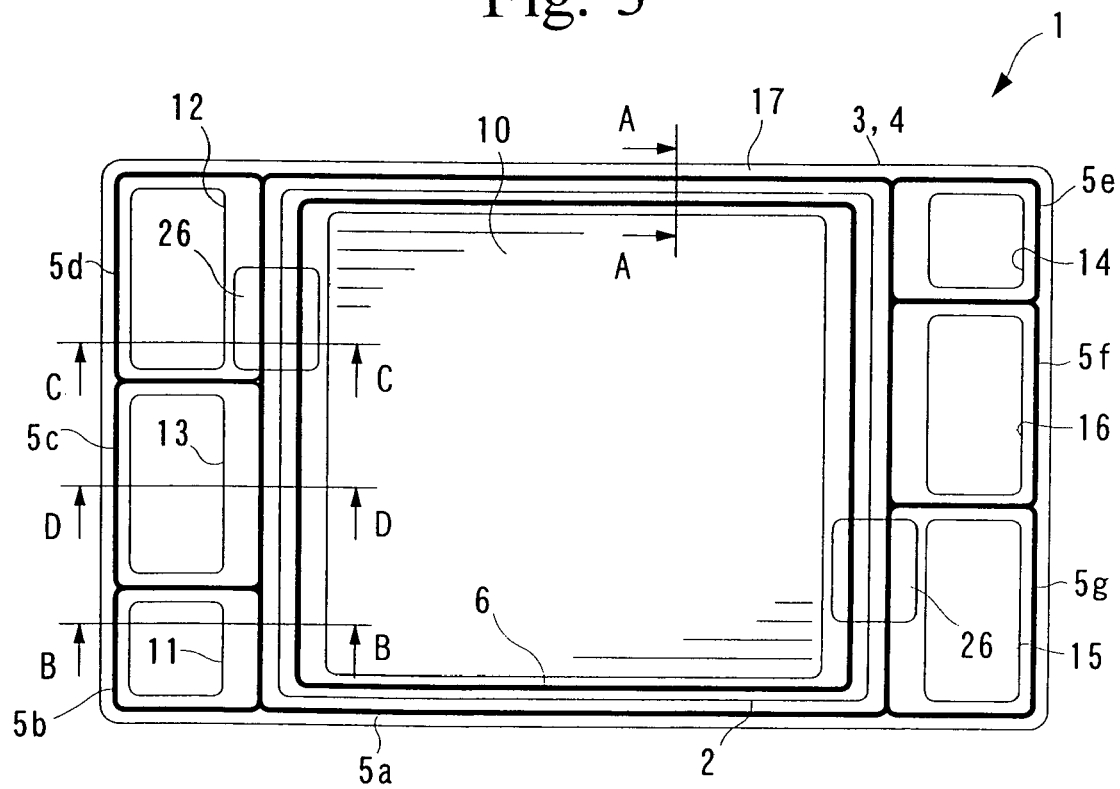
FIG. 3 is a plan view showing a schematic assembled state of the constituting elements of the fuel cell shown in FIG. 1.

The above-described cooling medium supply port 13 and the cooling medium exhaust port 16 are disposed at the center portion in the direction of width of the separators 3 and 4, as shown in FIG. 3. The fuel gas supply port 11 and the oxidant gas supply port 12 are disposed on both sides of the separators 3 and 4 in the direction of the width interposing the cooling medium supply port 13 therebetween. Furthermore, the fuel gas exhaust port 14 and the oxidant gas exhaust port 15 are disposed on both sides of the separators 3 and 4 in the direction of the width interposing the cooling medium exhaust port 16 therebetween. These fuel gas exhaust port 14 and the oxidant gas exhaust port 15 are disposed respectively so as to occupy diagonal positions of the fuel gas supply port 11 and the oxidant gas supply port 12.

Figure 4:
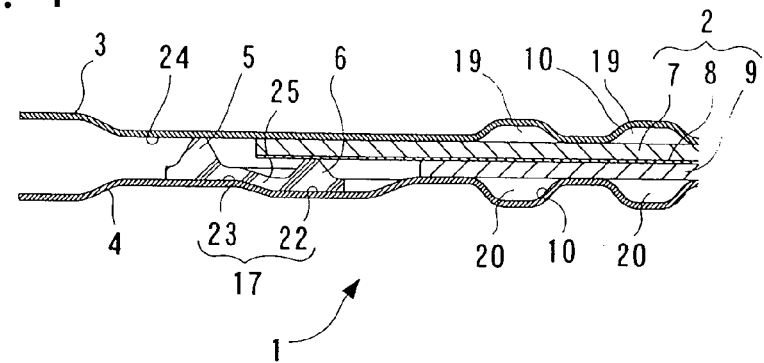
FIG. 4 is a longitudinal cross-sectional view of a fuel cell shown in FIG. 1 along line A-A shown in FIG. 3.
Figure 5:
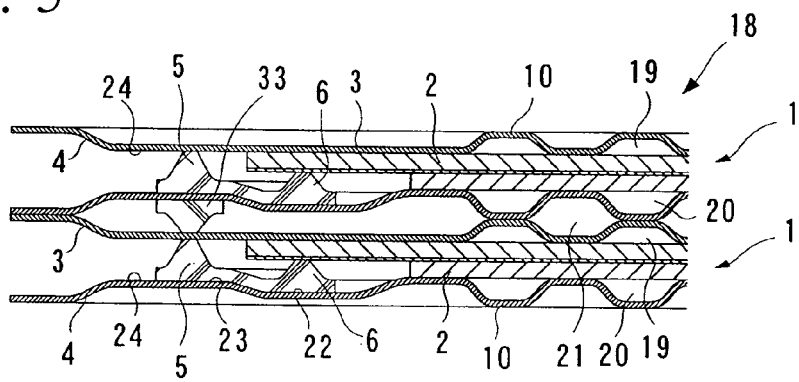
FIG. 5 is a longitudinal cross-sectional view of a fuel cell stack formed by stacking two fuel cell units.
Figure 6:
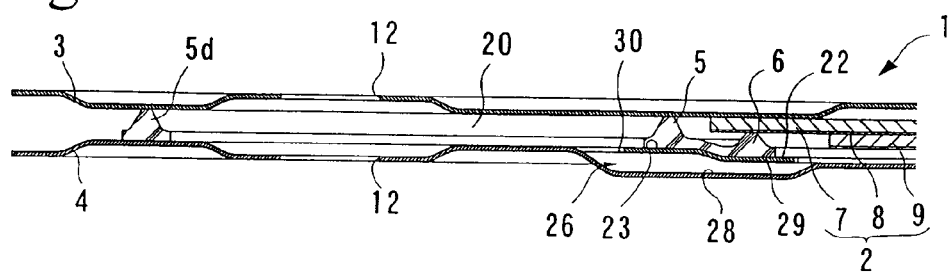
FIG. 6 is a longitudinal cross-sectional view of the fuel cell shown in FIG. 1 cut along line B-B shown in FIG. 3 in the vicinity of the inlet port of the oxidant gas.
Figure 7:
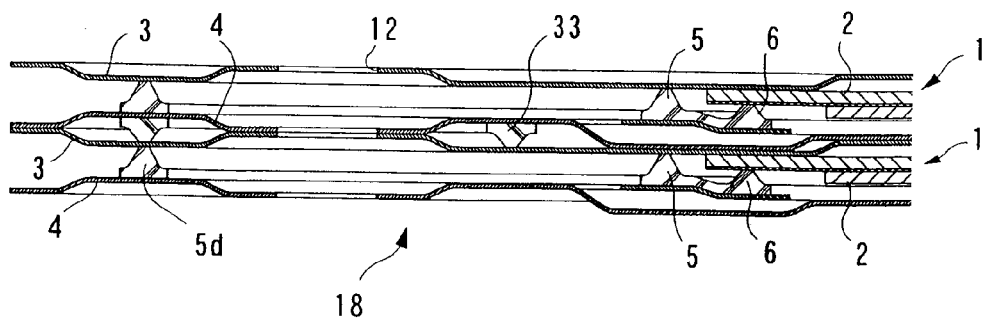
FIG. 7 is a longitudinal cross-sectional view showing a fuel cell stack formed by stacking two fuel cell units.
Figure 8:
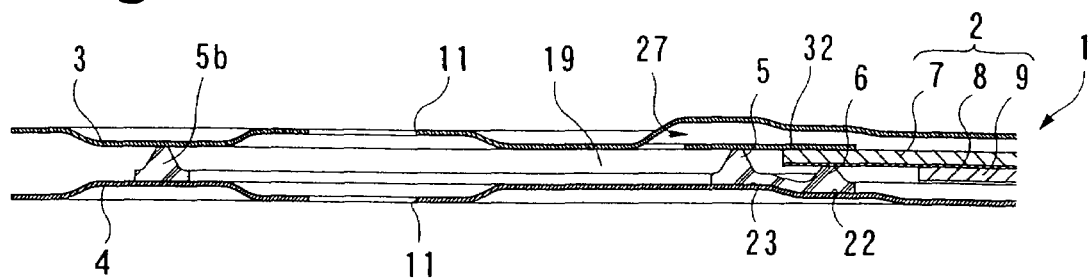
FIG. 8 is a longitudinal cross-sectional view of the fuel cell shown in FIG. 1 cut along line C-C shown in FIG. 3 in the vicinity of the inlet port of the fuel gas.
Figure 9:
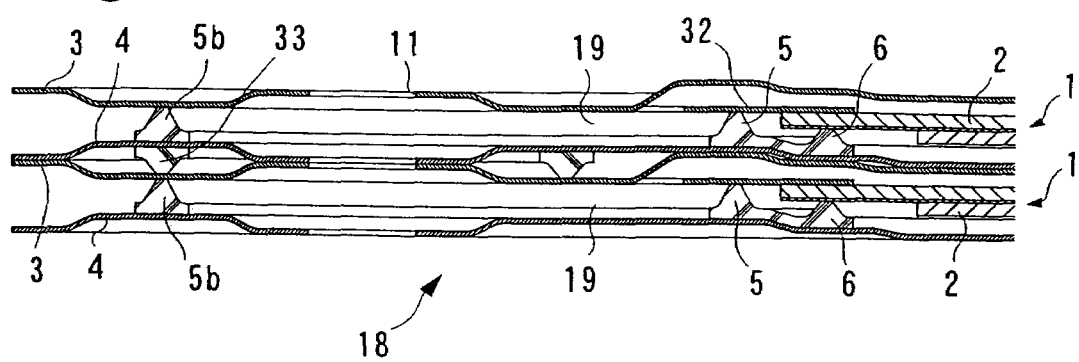
FIG. 9 is a longitudinal cross-sectional view of the fuel cell stack formed by stacking two fuel cell units shown in FIG. 8.
Figure 10:
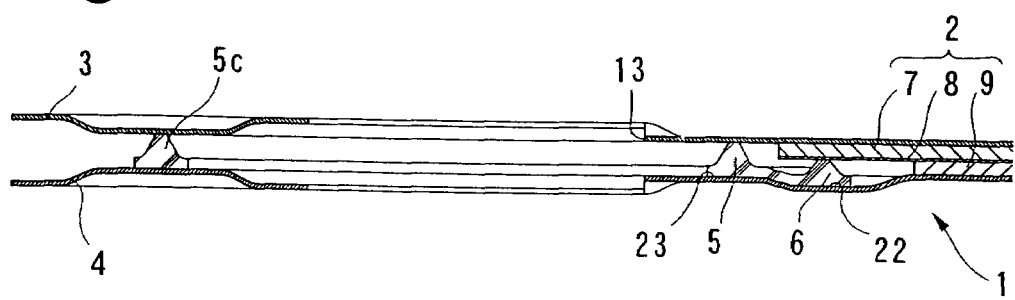
FIG. 10 is a longitudinal cross-sectional view of the fuel cell shown in FIG. 1 cut along line D-D shown in FIG. 3 in the vicinity of the inlet port of the cooling medium.
Figure 11:
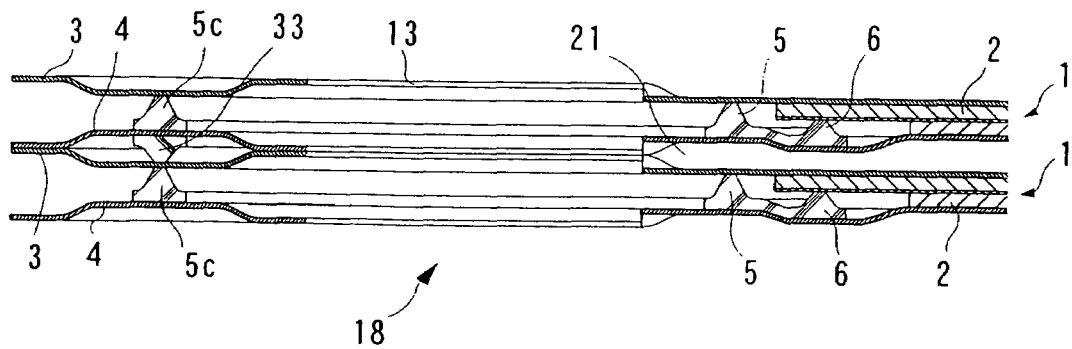
FIG. 11 is a longitudinal cross-sectional view of the fuel cell stack formed by stacking two fuel cell units shown in FIG. 10.

FIG. 4 shows a longitudinal cross-section of the side portion of the fuel cell along the line A-A in FIG. 3, FIG. 6 shows a longitudinal cross-section of the fuel cell adjacent to the fuel gas inlet port 12 along the line B-B in FIG. 3, FIG. 8 is a longitudinal cross-section of the fuel cell adjacent to the oxidant gas inlet port 13 along the line C-C in FIG. 3, and FIG. 10 is a longitudinal cross-section of the fuel cell adjacent to the cooling medium inlet port 13 along the line D-D in FIG. 3. FIGS. 5, 7, 9, and 11 are longitudinal cross-sections of the fuel stacks 18, in which two fuel cells shown respectively in FIGS. 4, 6, 8, and 10 are stacked.

As shown in FIG. 4, regarding the aforementioned corrugated portions 10 of the first and second separators, the corrugated portion 10 of the first separator 3 defines a passage 19 for the fuel gas between the anode electrode 7, which constitutes the membrane electrode assembly 2, and the corrugated portion 10 of the second separator 4 defines a passage 20 for the oxidant gas. As shown in FIG. 5, in the state when a fuel stack is formed by stacking fuel cells, a corrugated portion 10 of the first separator 3 of an adjacent fuel cell 1 and the corrugated portion 10 of the second separator 4 form a passage 21 for circulating the cooling medium.

As shown in FIG. 1, the aforementioned plane portion 17 of the second separator 4 is divided into a first plane portion 22, which is in contact with the inner seal member 6, and a second plane portion 23, which is in contact with the outside seal member 5.

The first plane portion 22 is disposed so as to face a protruded portion (shown as a portion defined by oblique lines in FIG. 2) of the anode electrode 7, which is protruded from the outer periphery of the cathode electrode 6 by an amount corresponding to the height difference of both electrodes.

The second plane portion 23 is disposed so as to enclose the membrane electrode assembly at the outer side of the outer periphery of the membrane electrode assembly 2 when the membrane electrode assembly 2 is disposed facing to the corrugated portion 10. In addition, the second plane portion 23 continuously extends around the supply ports of the fuel gas, oxidant gas, and cooling medium, and the exhaust ports of the fuel gas, oxidant gas, and cooling medium, which are disposed further outside the second plane portion 23.

As shown in FIG. 4, in the fuel cell according to the present embodiment, a step is formed between the first plane portion 22 and the second plane portion 23. That is, the first plane portion 22 and the second plane portion 23 are respectively disposed in two parallel planes, which are separated by a certain distance in the normal direction.

The height of the step is preferably the same dimension as that of an total thickness of the anode electrode 7 and the electrolyte membrane 8.

The plane portion 24 of the first separator 3 is disposed in a plane located opposing to the first plane portion 22 and the second plane portion 23 of the second separator 4.

As a result, the inner seal member 6 and the outer seal member 5 are formed so as to have the same cross section. In this arrangement, both seal members are preferably provided with the same height, which is the minimum required for obtaining a sufficient hermetic seal.

As shown in FIG., 3, the inner seal member 6 is formed in an approximately rectangular shaped ring to be in contact with the exposed portion of the electrolyte membrane 8 of the membrane electrode assembly 3. The outside seal member, in contrast, is formed by a plurality of approximately rectangular rings comprising a large and approximately rectangular ring portion 5a surrounding the membrane electrode assembly, and a plurality of rectangular ring portions 5b to 5g surrounding the inlet ports 11, 12, and 13 and the exhaust ports 14, 15, and 16 for the fuel, oxidant gas, and cooling medium.

All ring portions 5a to 5g are united in an integrated form, partially sharing the overlapping portions of respective rings, and thereby the sealing area is limited in a minimum area. In addition, the inner sealing member 6 and the outer sealing member 5 are integrated by connecting to each other through a connecting portion 25, and thereby the reduction of the number of parts are realized.

As described above, provisions of the outer sealing member 5 and the inner sealing member 6 allows defining and tight sealing or liquid tight sealing of the supply ports 11, 12 and 13 and exhaust ports 14, 15, and 16 of the fuel gas, oxidant gas, and cooling medium and the corrugated portion 10. Furthermore, in order to circulate and exhaust the fuel gas and oxidant gas through respective passages 19 and 20 formed between corrugated portions 10 by inputting from respective supply ports 11 and 12 and in order to exhaust these gases from respective exhaust ports 14 and 15, communication portions 26 and 27 are formed for communicating between intermediate portions of each supply port and each passage and intermediate portions between each exhaust port and each passage, detouring around the outer sealing member 5 and the inner sealing member 6.

Figure 12:
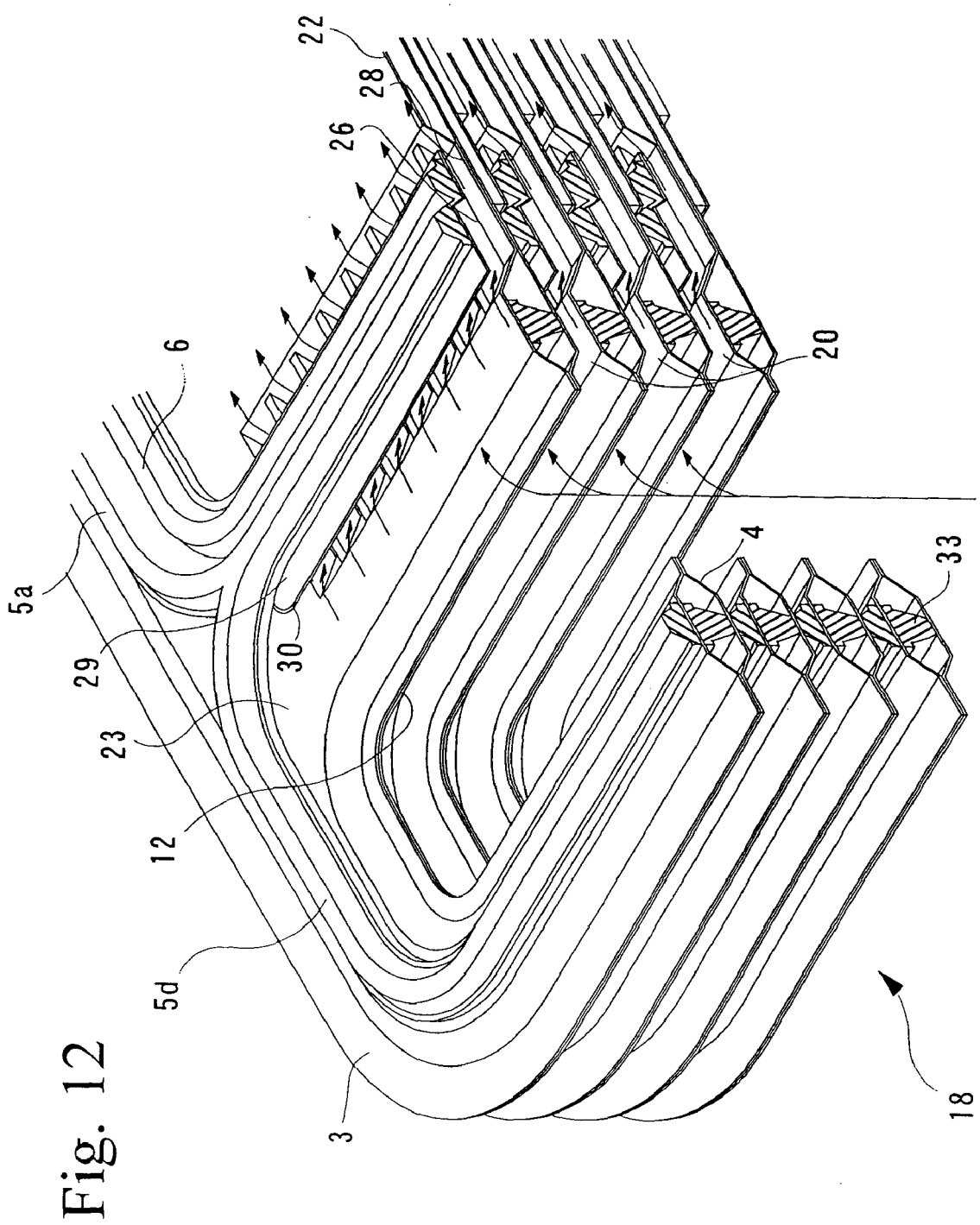
FIG. 12 is a perspective view showing a communication portion adjacent to the oxidant gas inlet port, including a partial cross-section along line B-B line shown in FIG. 3.

As shown in FIGS. 6, 7 and 12, in these communicating portions 26 and 27, the communication portion 26 of the oxidant gas, for example, is formed by crossing a bridge member 29 on a concave portion 28 in the direction along the seal members 5 and 6. The aforementioned concave portion 28 is formed by partially indenting the first plane portion 22 and the second plane portion 23 at a wider width than the total width of the outer seal member 5 and the inner seal member 6, and the bridge member 29 is formed to be narrower in the width than the width of the concave portion and is formed to be wider in the width than the total width of the outer seal member 5 and the inner seal member 6. The surface plane of the bridge member 29 is formed covering the concave portion 28 having a step in the level so as to connect the first plane portion 22 and the second plane portion 23 without difference in the level, and both ends of the bridge member are received in respective positioning recesses 30 formed on both sides of the concave portion 28 by a depth corresponding to a plate thickness.

According to the aforementioned construction, the outer seal member 5 and the inner seal member 6 allow circulation of the oxidant gas only at the communication portion 26 and the other portions are maintained at the tightly sealed state such that the oxidant gas supplied from the supply port 12 can be circulated on the surface of the cathode electrode 9 through the communication portion 26.

FIG. 12 is a perspective view showing a communication portion adjacent to the oxidant gas inlet port, including a partial cross-section along the line B-B shown in FIG. 3. By constituting the fuel stack as shown in FIG. 12, the oxidant gas which is flowed in from the oxidant gas inlet ports 12 opening while communicating in the direction of the stacking direction of the fuel cells as shown by arrows in the figure, is branched into a plurality of oxidant gas passages 20 formed between respective separators 3 and 4, in order to make a detour around the outer seal member 5 and the inner seal member 6.

As shown in FIGS. 8 and 9, similarly to the oxidant gas, the fuel gas supplied from the supply port 11, can be circulated in the passage 19, which is defined between the first separator 3 and the anode electrode 7, by forming a communication portion 27 by crossing a bridge member 32 on the concave portion 31 formed by partially depressing the first separator 3, defining the passage 19 of the fuel gas.

In the fuel gas stack formed by stacking a plurality of fuel cells, a seal member 33 is disposed between the first separator 3 of one fuel cell 1 and the second separator 4 of the other adjacent fuel cell 1 in order to define supply ports 11 and 12 and exhaust ports 14 and 15 of the fuel gas and the oxidant gas and to define a cooling medium passage from the inlet port 13 to the exhaust port 16 of the cooling medium. The seal member is disposed between two rear surfaces of respective second plane members 23 of two adjacent fuel cell units in order to support the seal member 33 in a stable and reliable manner because two separators 3 and 4 are formed by press molding the metal plates.

Hereinafter, operations and effects of the fuel cell 1 and the fuel cell stack 18 according to the first embodiment are explained.

In the fuel cell 1 according to the present embodiment, since the anode electrode 7 forming the membrane electrode assembly 2 supports one surface of the electrolyte membrane 8, the electrolyte membrane 8 is not deformed and is held in place by addition of the pressure of the inner sealing member. Accordingly, not only the hermetic seal between the electrolyte membrane 8 and the inner seal member 6 can be maintained, but also a force is not applied to both electrodes 7 and 9 to be peeled from the electrolyte membrane 8, and the membrane electrode assembly is maintained at a sound state.

Figure 13:
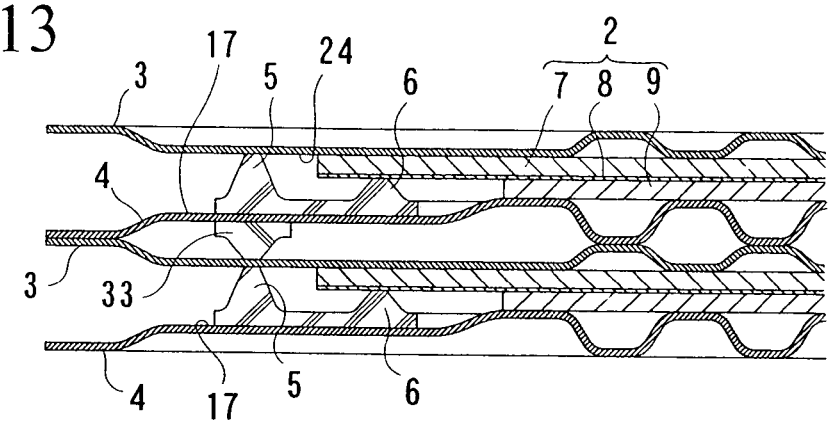
FIG. 13 is a longitudinal cross-sectional view explaining the action of the fuel cell shown in FIG. 1.

In the above case, if it is desired to hold the aforementioned hermetic seal just by sandwiching the electrolyte membrane 8 and the anode electrode 7 between the inner seal member 6 and the first separator 3, a difference in height is caused, as shown in FIG. 13, between a space between the electrolyte membrane 8 and the second separator 4 to be sealed by the inner sealing member 6 and a space between the first separator 3 and the second separator 4 to be sealed by the outer seal member 5. If the height of the inner seal member 6 is set at a minimum required height for sealing the space, the height of the outer seal member 5 for sealing a higher space than that of the space for the inner sealing member 6 becomes so high that it requires useless seal material.

In the present embodiment, since a step is formed between the first plane portion 22 and the second plane portion 23, the difference of the height between the space to be sealed by the outer seal member 5 and the space to be sealed by the inner seal member 6 can be reduced. In particular, when the height of the step is made identical with the total thickness of the thickness of the anode electrode 7 and the thickness of the electrolyte membrane 8, both space heights to be sealed by the outer and inner seal member 5 and 6 can be the same. Consequently, heights of the outer seal member 5 and the inner seal member 6 can be the same as that of the minimum height for sealing the space, which results in saving the material and reducing cost.

In the fuel cell according to the present embodiment, when compared with the fuel cell shown in FIG. 13, which does not have a step, it is possible to reduce the thickness between both separators 3 and 4 by the size of the step.

The above effect is obtained due to the reduction of the space itself between the first separator 3 and the second separator which has been sealed by outer seal member 5, whose thickness has been unnecessarily thick when the seal member 33 between two fuel cells is set at a minimum size, by dropping a part of the first plane portion 22 in contact with the inner seal member 6 in the plane portion 17 of the second separator 4 in contact with both outer seal member 5 and the inner seal member 6.

As a result, although the respective passages 19 to 21 become narrower, no problems arise because sufficient areas can be secured for these passages 19 to 21 by optimizing the pitches and so on of the corrugated portion 10.

That is, it is possible to say that the thickness of a fuel cell is determined by the outer seal members disposed back to back on both sides of the separators 3 and 4 and the thickness of the seal member 33 for sealing two fuel cells. Accordingly, it is possible to reduce the thickness of the outer seal members while maintaining the thickness of the seal member 33 for sealing to adjacent fuel cells is at a minimum thickness.

Moreover, since the fuel cell stack 8 according to the present embodiment is constituted by stacking a plurality of fuel cells having a reduced thickness as described above in the direction of thickness, the total thickness of the fuel cell stack becomes thin by an amount corresponding to the reduced thickness of a fuel cell times the number of fuel cells being stacked. Since the number of fuel cells of the fuel cell stack is normally around 100, the effect of reducing the thickness of a fuel cell is enormous. As a result, it is possible to reduce a setting space to a large extent when a fuel cell stack 18 is loaded on a vehicle.

Note that the present invention is not limited to use an anode electrode 7 as shown in the above embodiment as the backing member for the electrolyte membrane. which contacts the inner seal member 6.

In place of the anode electrode, for example, it is possible to insert a cathode electrode in between the first separator 3 and the inner seal member 6.

Figure 14:
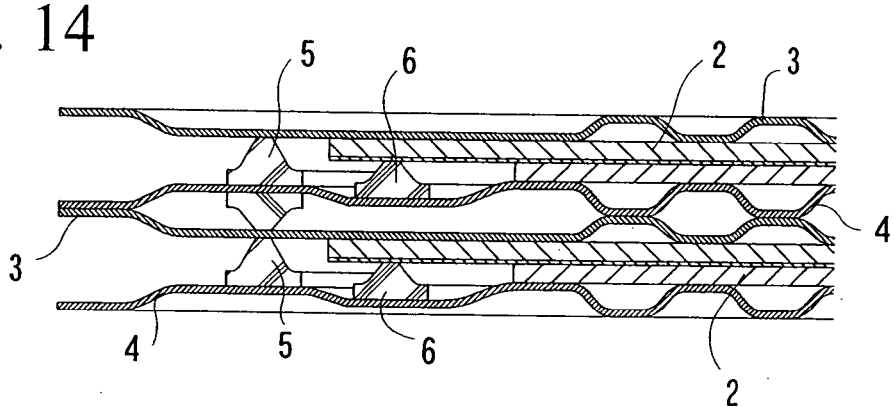
FIG. 14 is a longitudinal cross-sectional view showing a first modified example of the fuel cell shown in FIG. 3.

In the above embodiment, the outer seal member 5 and the inner seal member 6 are integrated by connecting using a connecting portion 25 in order to reduce the number of parts of the fuel cell assembly. However, the present invention is not limited to this constitution, and as shown in FIG. 14, for example, it is a matter of course to produce and arrange the outer seal member 5 and the inner seal member 6 as separate parts for sandwiching the electrolyte membrane 8.

Figure 15:
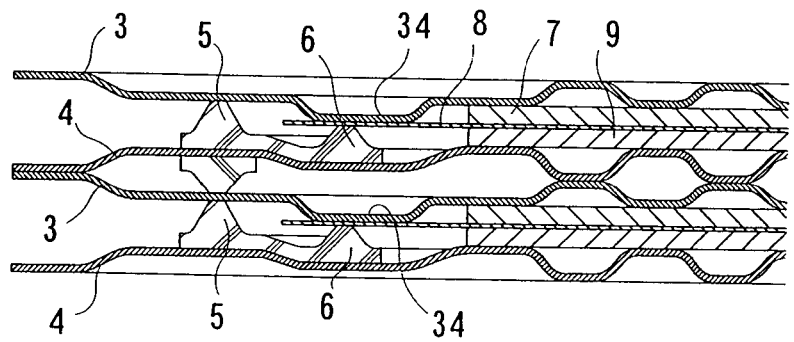
FIG. 15 is a longitudinal cross-sectional view showing a second modified example of the fuel cell shown in FIG. 3.
Figure 16:
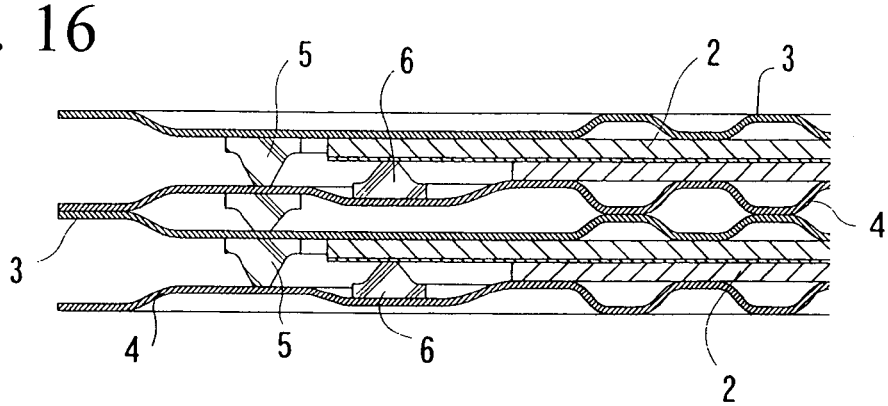
FIG. 16 is a longitudinal cross-sectional view showing a third modified example of the fuel cell shown in FIG. 13.

Furthermore, as shown in FIGS. 15 and 16, it is possible to adopt a structure to directly sandwich the electrolyte membrane between the inner seal member 6 and a backing plane portion 34, which is formed by protruding downwardly a part of the first separator 3 opposing to the inner seal member 6 interposing the electrolyte membrane 8 by a thickness of the anode electrode.

In addition, although, in the above embodiment, a structure is adopted in which both of the outer seal member 5 and the inner seal member 6 are supported by the plane portion 17 of the second separator 4, it is possible, instead, as shown in FIG. 16, to provide the outer seal member on the first separator 3 and to provide the inner seal member on the second separator 4.

In the above embodiment, a description was provided that it is preferable to set the difference of the level between the first plane portion 22 and the second plane portion 23 at an amount corresponding to a sum of thickness of the anode electrode 7 and thickness of the electrolyte membrane. However, in place of the above structure, the difference of the level may be suitably selected based on various reasons such as for ensuring spaces of passages 19 to 22 for oxidant gas, fuel gas, and cooling medium.

In addition, the seal members 5 and 6 may be adhered to separators at the time of assembly, or may be assembled integrally with the separators.

In addition, although the separators in the above embodiment are formed by metal plates, instead, compact carbon materials may be used.

The second group of the present invention will be described below with reference to the attached drawings FIG. 17 to FIG. 29.

Figure 17:
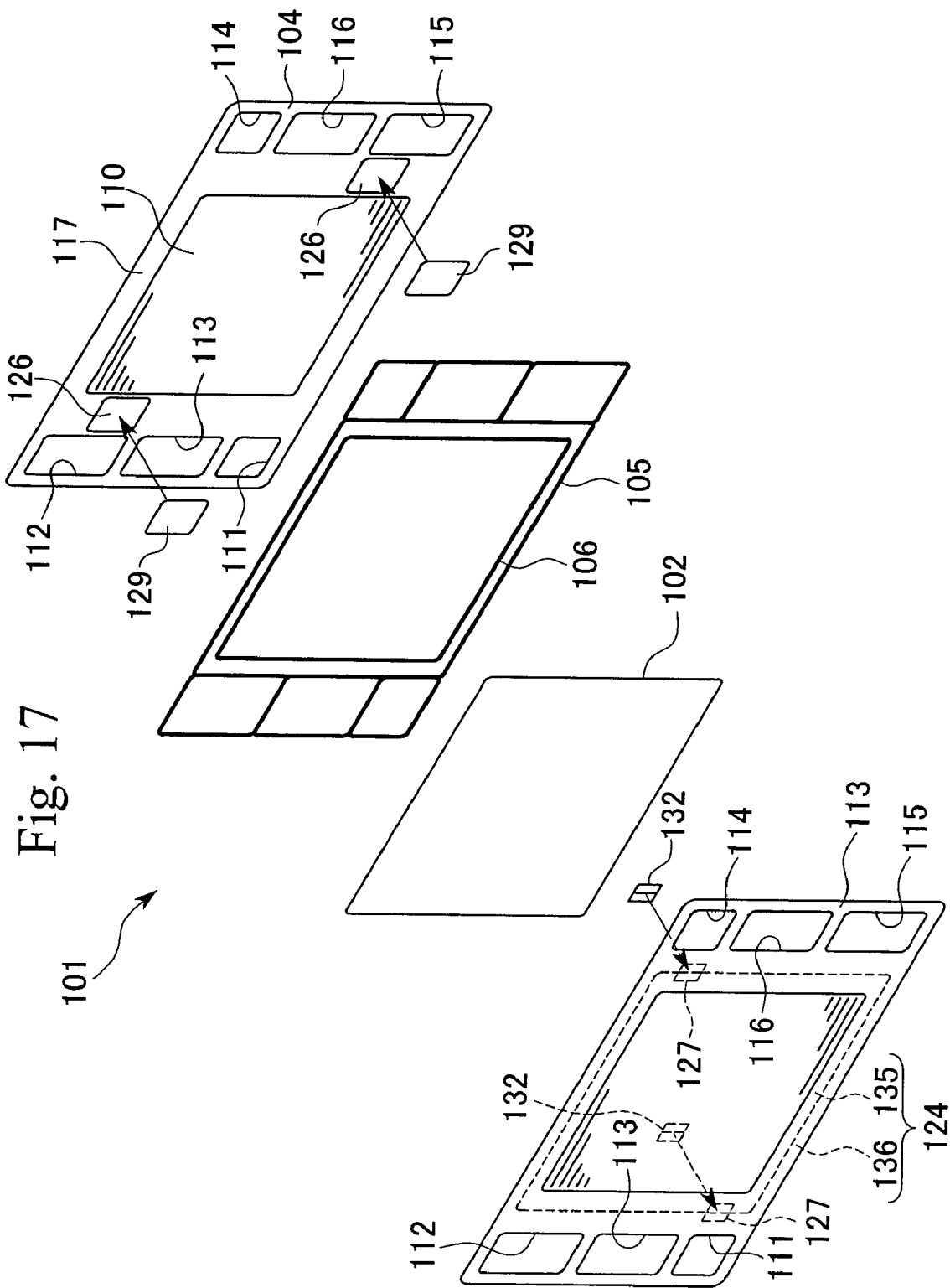
FIG. 17 is an exploded perspective view schematically showing the constituting elements of a fuel according to the second embodiment of the present invention.
Figure 18:
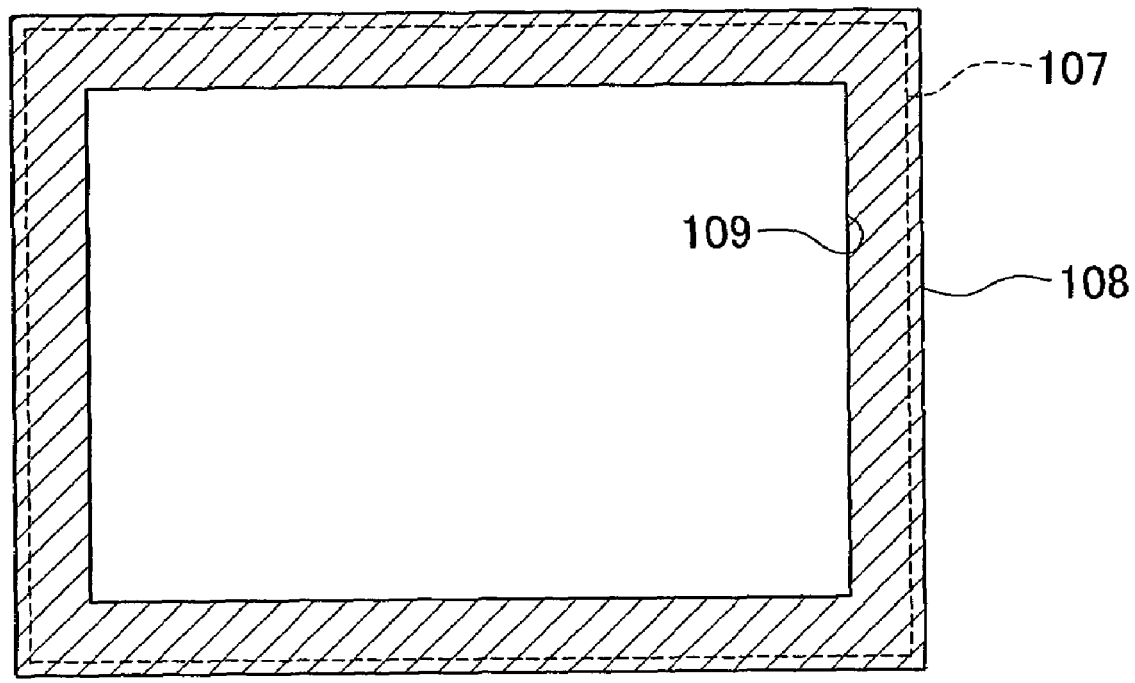
FIG. 18 is a plan view showing an electrode assembly used in the fuel cell shown in FIG. 19.
Figure 19:
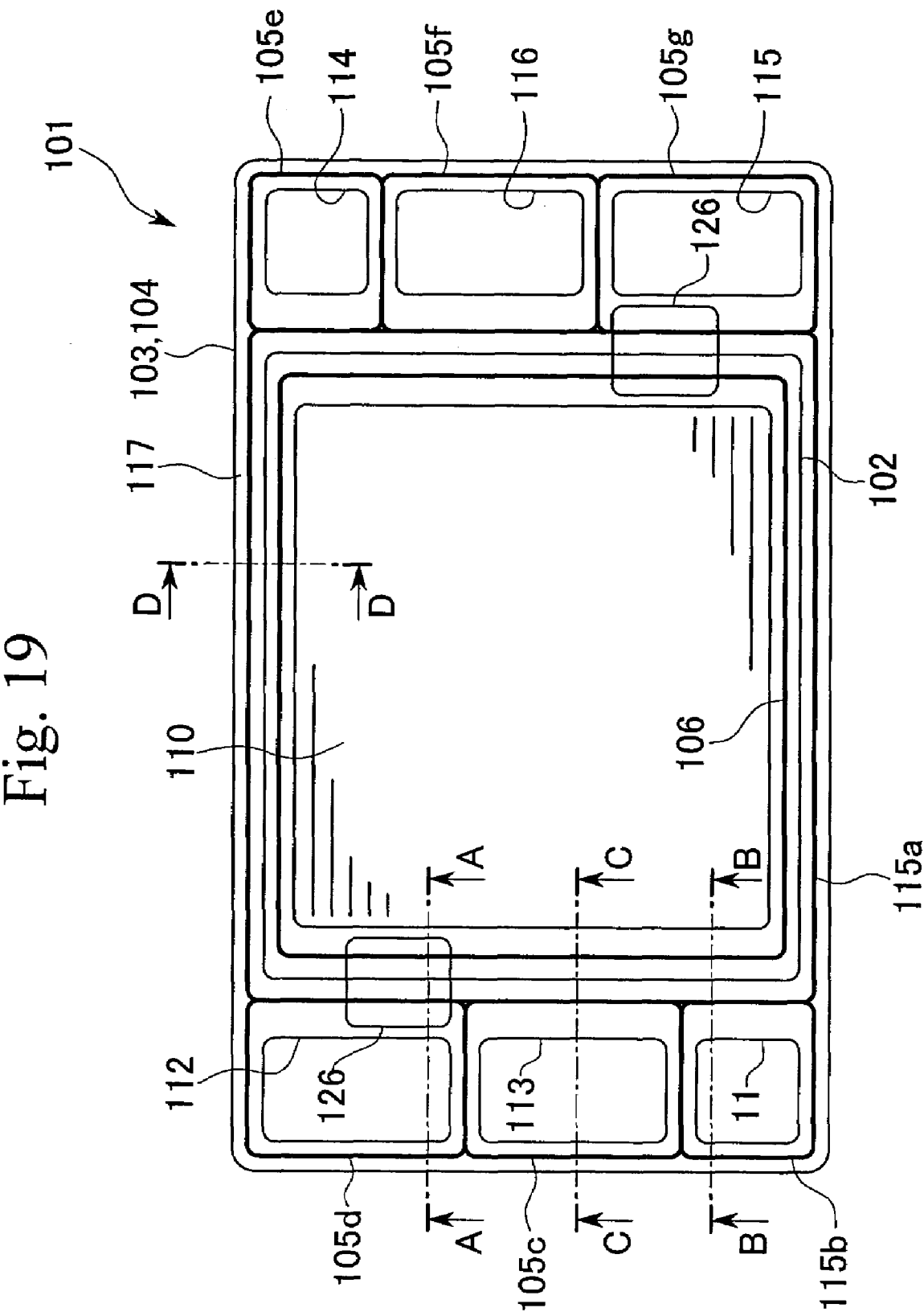
FIG. 19 is a plan view schematically showing the assembled state of the constituting elements of the fuel cell shown in FIG. 17.

A fuel cell according to the second embodiment is, as shown in FIGS. 17 to 19, constructed by sandwiching a membrane electrode assembly 102 with a pair of separators (first separator 103 and second separator 104), by tightly sealing the space between the first separator 103 and the second separator 104 with an outer peripheral sealing member 105 so as to surround the membrane electrode assembly 102, and by tightly sealing the space between the second separator 104 and the membrane electrode assembly 102 with an inner peripheral sealing member 106.

The aforementioned membrane electrode assembly comprises a solid polymer electrolyte membrane 108 (hereinafter, abbreviated as electrolyte membrane), made of a perfluorosulfonate polymer, and an anode electrode 107 and a cathode electrode 109, which sandwich both surfaces of the electrolyte membrane 108.

The anode electrode 7 and cathode electrode 109 are constituted by, for example, laminating a catalyst layer made of a platinum alloy mainly formed by platinum, on a gas diffusion layer of the electrolyte membrane 108, wherein the gas diffusion layer is formed by a porous carbon cloth or a porous carbon paper.

The aforementioned electrolyte membrane 108 is formed as a rectangle and the anode electrode 107 is formed covering the total surface area of the electrolyte membrane or covering a larger area than the total area of the electrolyte membrane protruding from the edge of the electrolyte membrane 108. The cathode electrode 109 is formed in a smaller area than that of the anode electrode. These electrolyte membrane, anode electrode, and cathode electrode are formed such that the center of gravity of each element coincides and each element has the same dimensions from the edge of the electrolyte membrane. The anode electrode 107 thereby covers the entire surface of one surface of the electrolyte membrane 108 like a backing, and in contrast. the outer periphery of the other surface of the electrolyte membrane 108 is exposed and the inside of this surface is covered by the cathode electrode 109.

The aforementioned first separator 103 and the second separator 104, as shown in FIG. 17, comprise a corrugated sheet portion 110 in which a plurality of concave and convex portions having a certain height are formed in a certain pattern by press molding a stainless steel plate material having a plate thickness of from 0.2 to 0.5 mm; a fuel gas supply port 111, an oxidant gas supply port 112, a cooling medium supply port 113, a fuel gas exhaust port 114, an oxidant gas exhaust port 115, a cooling medium exhaust port 116 for supplying and exhausting the fuel gas (for example, hydrogen gas) and oxidant gas (for example, air containing oxygen) and the cooling medium (for example, water); and furthermore, a plane portion 117 is disposed so as to respectively surround these supply ports 111 to 113 and these exhaust ports 114 to 116.

The above-described cooling medium supply port 113 and the cooling medium exhaust port 116 are disposed at the center portion in the direction of width of the separators 103 and 104, as shown in FIG. 19. The fuel gas supply port 111 and the oxidant gas supply port 112 are disposed on both sides of the separators 103 and 104 in the direction of the width interposing the cooling medium supply port 113 therebetween. Furthermore, the fuel gas exhaust port 114 and the oxidant gas exhaust port 115 are disposed on both sides of the separators 103 and 104 in the direction of the width interposing the cooling medium exhaust port 116 therebetween. These fuel gas exhaust port 114 and the oxidant gas exhaust port 115 are disposed respectively so as to occupy diagonal positions of the fuel gas supply port 111 and the oxidant gas supply port 112.

Cross-sectional views of each section of a fuel cell stack 118 formed by stacking a plurality of fuel cells 101 composed in a manner shown in FIGS. 20 through 23. FIGS. 20 through 23 are longitudinal cross-sectional views taken along lines A-A through D-D shown in FIG. 19.

Figure 23:
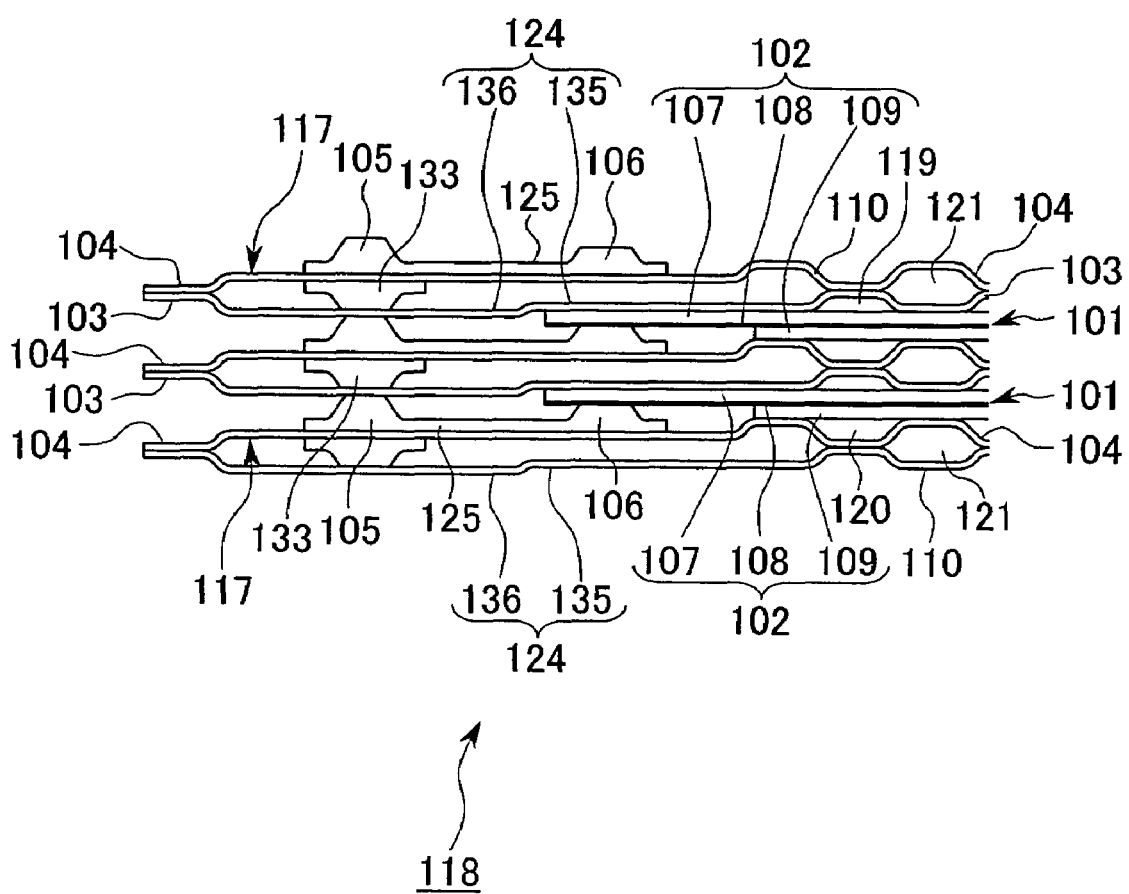
FIG. 23 is a longitudinal cross-sectional view of the side of a fuel stack formed by stacking two fuel cells as shown in FIG. 17 taken along line D-D shown in FIG. 19.

With respect to the corrugated portions 110, as shown in FIG. 23, the corrugated portion 110 of the first separator 103 defines a passage 119 for fuel gas between the anode electrode 107, which composes the electrode assembly 2, and the corrugated portion 110 of the second separator 104 defines a passage 120 for the oxidant gas between cathode electrode 109. In addition, in the state in which fuel cell stack 118 is formed by stacking fuel cells 101, a passage 121 through which a cooling medium circulates is defined by corrugated portion 110 of the first separator 103 of an adjacent fuel cell 101 and corrugated portion 110 of the second separator 104.

A plane portion 124 of the first separator 103 is, for example disposed within the same plane at a position in opposition to an inner plane portion 122 and an outer plane portion 123 in the second separator 104.

In the first separator 103, the plane portion 124 is divided into an inner plane portion 135 that contacts the peripheral edge of anode electrode 107 and an outer plane portion 136 that contacts outer seal member 105.

The inner plane portion 135 is provided at a position that contacts the protruding portion of anode electrode 107 protruding from the outer periphery of the cathode electrode 109 due to the dimensional difference between anode electrode 107 and cathode electrode 109 in the electrode assembly 102 when the electrode assembly 102 is disposed in opposition to corrugated portion 110.

The outer plane portion 136 is disposed at a position that surrounds the electrode assembly 102 farther to the outside than the outer periphery of electrode assembly 102 when electrode assembly 102 is disposed in opposition to corrugated portion 110. In addition, the outer plane portion 136 continuously extends around each of the supply ports 111 through 113 and exhaust ports 114 through 116 of the fuel gas, oxidant gas and cooling medium, which are disposed farther to the outside.

Figure 20:
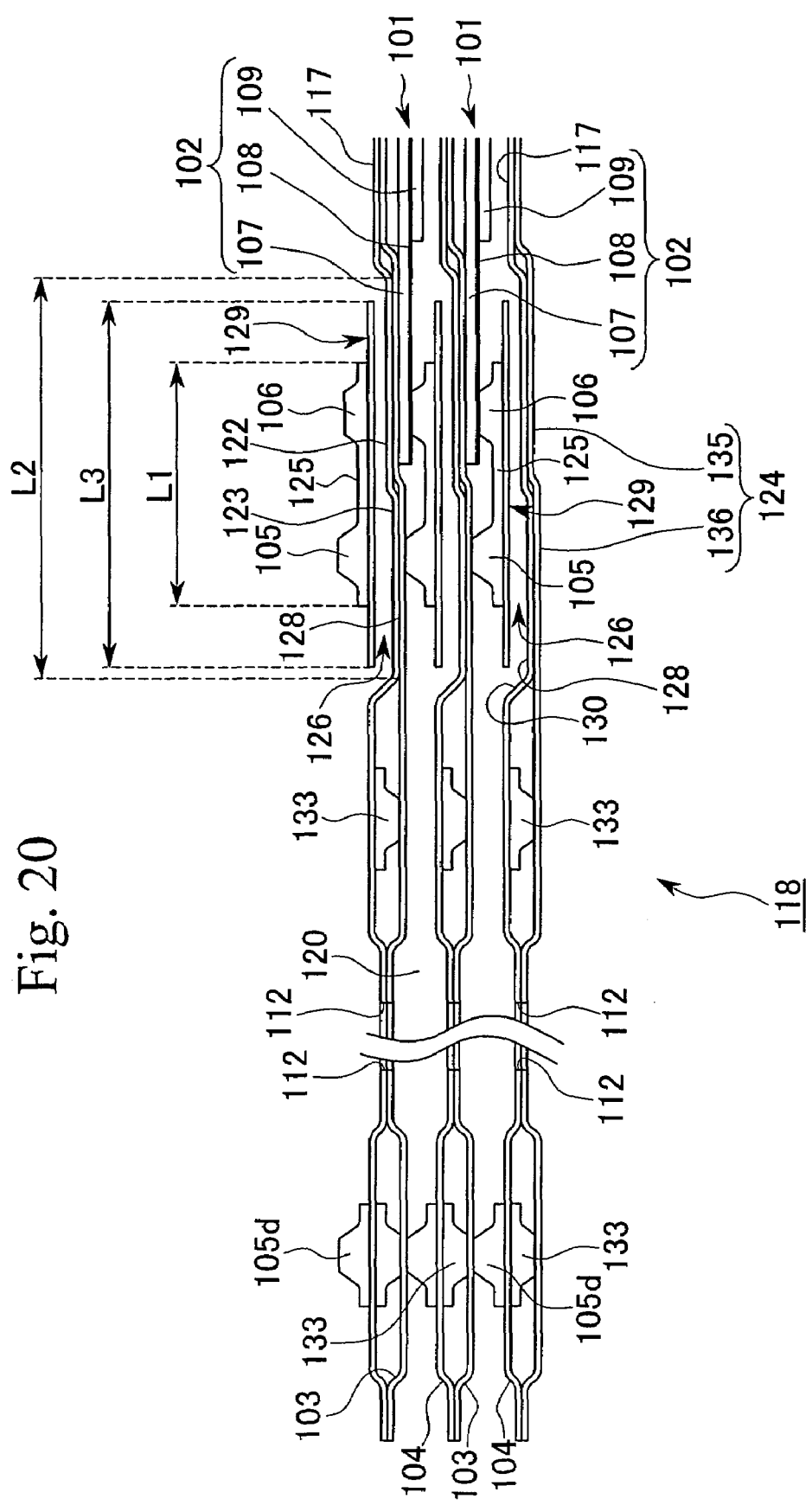
FIG. 20 is a longitudinal cross-sectional view of the vicinity of the oxidant gas supply port in a fuel cell stack formed by stacking two fuel cells as shown in FIG. 17 taken along line A-A shown in FIG. 19.

In fuel cell 101 according to the present embodiment, as shown in FIG. 20, a step is formed between the inner plane portion 135 and the outer plane portion 136. Namely inner plane portion 135 and outer plane portion 136 are respectively disposed in two parallel planes that are separated by a fixed distance in the direction of thickness of separator 103.

The height of this step, for example, is preferably the same dimension as the combined thickness of anode electrode 107 and electrolyte membrane 108.

On the other hand, plane portion 117 in second separator 104 is disposed, for example, within the same plane at a position in opposition to inner plane portion 135 and outer plane portion 136 in first separator 103.

As a result, the inner seal member 106 and the outer seal member 105 are formed in a flat plane (plane portion) in the second separator 104. In this case, both seal members 105 and 106 preferably have height dimensions that are minimally required for achieving sufficient sealing.

As shown in FIG. 19, the inner seal member 106 is formed roughly in the shape of a rectangular ring that contacts the exposed portion of electrolyte membrane 108 of the electrode assembly 103. In addition, the outer seal member 105 is composed of a large, roughly rectangular ring portion 105*a* that surrounds the electrode assembly 102, and a plurality of small roughly rectangular ring portions 105*b* through 105*g* that surround the periphery of the supply ports 111 through 113 and exhaust ports 114 through 116 for the fuel gas, oxidant gas and cooling medium. All of the ring portions 105*a* through 105*g* are unitarily formed by mutually sharing overlapping portions, thereby enabling the sealing area to be held to a minimum. In addition, as shown in FIG. 20, the inner seal member 106 and the outer seal member 105 are integrated by being connected through a connecting portion 125, thereby making it possible to decrease the number of parts.

Furthermore, as a result of disposing outer seal member 105 and inner seal member 106 in this manner, the supply ports 111 and 112 and the exhaust ports 114 and 115 for the fuel gas, oxidant gas and cooling medium are separated from corrugated portion 110 in an air-tight or liquid-tight state. However, in order to allow fuel gas or oxidant gas supplied from supply ports 111 and 112 to circulate through passages 119 and 120, respectively defined by corrugated portions 110, as well as be discharged from exhaust portions 114 and 115, communication portions 126 and 127, for connecting both supply ports 111 and 112 with passages 119 and 120 and exhaust ports 114 and 115 with passages 119 and 120, are provided detouring around outer seal member 105 and inner seal member 106 (see FIGS. 20 and 21).

As shown in FIG. 20, these communication portions 126 and 127 are composed for example in the case of oxidant gas communication portion 126, by crossing a bridge member 129 over a concave portion 128 in the direction along the seal members 105 and 106. The concave portion 128 is formed by partially indenting plane portion 117 of second separator 104 that defines the oxidant gas passage 120 at a width L2 that is wider than the total width L1 of the outer seal member 105 and the inner seal member 106, while the bridge member 129 is formed at a width L3 that is narrower than width L2 of said concave portion 128 but wider than the total width L1 of the outer seal member 105 and the inner seal member 106. Both ends of the surface 105 of bridge member 129 are housed in position recesses 130 formed on both sides of concave portion 128 at a depth corresponding to the plate thickness of bridge member 129.

As a result, outer seal member 105 and inner seal member 106 allow oxidant gas to only circulate through connecting portion 126, while the remainder is maintained in a tightly sealed state such that oxidant gas supplied from supply port 112 is able to circulate on the surface of cathode electrode 109 through the communication portion 126.

Figure 21:
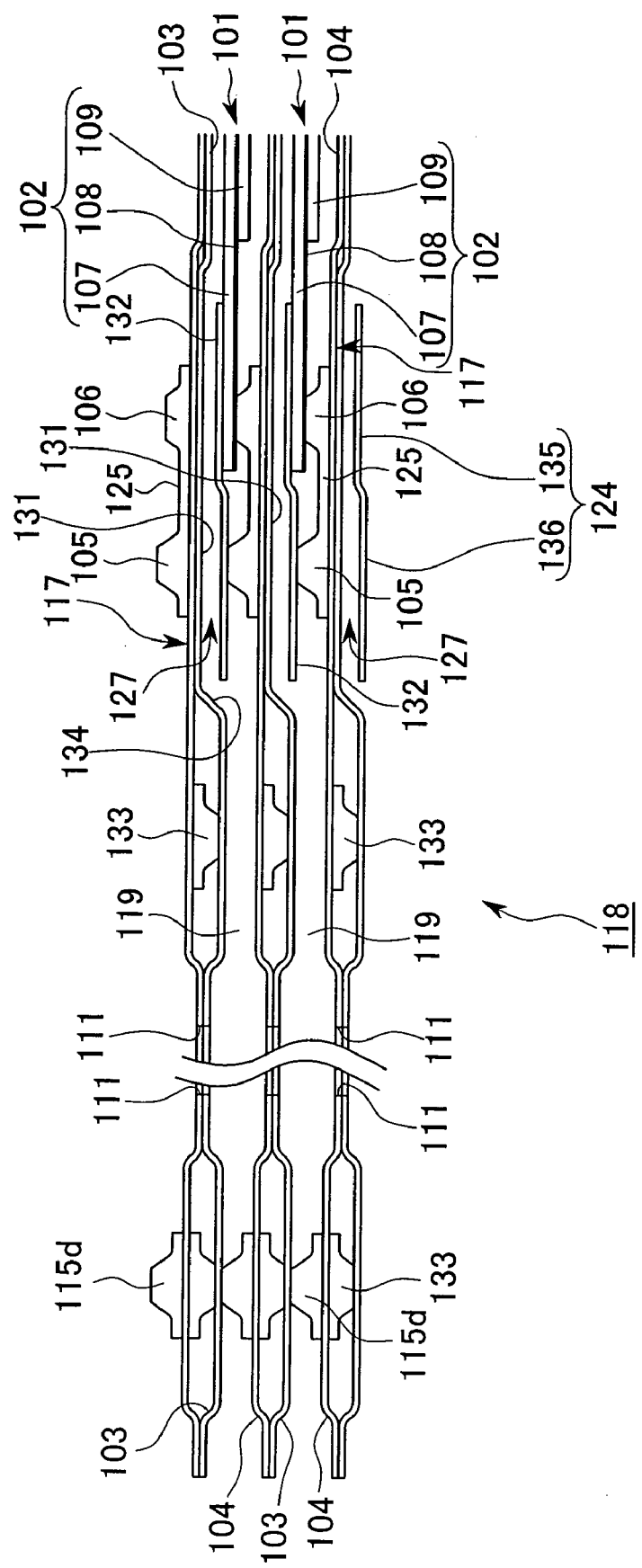
FIG. 21 is a longitudinal cross-sectional view of the vicinity of the fuel gas supply port in a fuel cell stack formed by stacking two fuel cells as shown in FIG. 17 taken along line B-B shown in FIG. 19.

In addition, as shown in FIG. 21, similarly for the fuel gas, by composing the communicating portion 127 so that a bridge member 132 crosses over a concave portion 131, which partially indents the first separator that defines fuel gas passage 119, fuel gas supplied from supply port 111 is able to circulate through passage 119 formed between the first separator 103 and anode cathode 107. The surface of bridge member 132 itself has a step so that inner plane portion 135 and outer plane portion 136 are connected over the concave portion 131 without the presence of a level difference, and both ends of the bridge member 132 are housed in positioning recesses 134 formed on both sides of the concave portion 131 by a depth corresponding to the plate thickness of bridge member 132.

Figure 22:
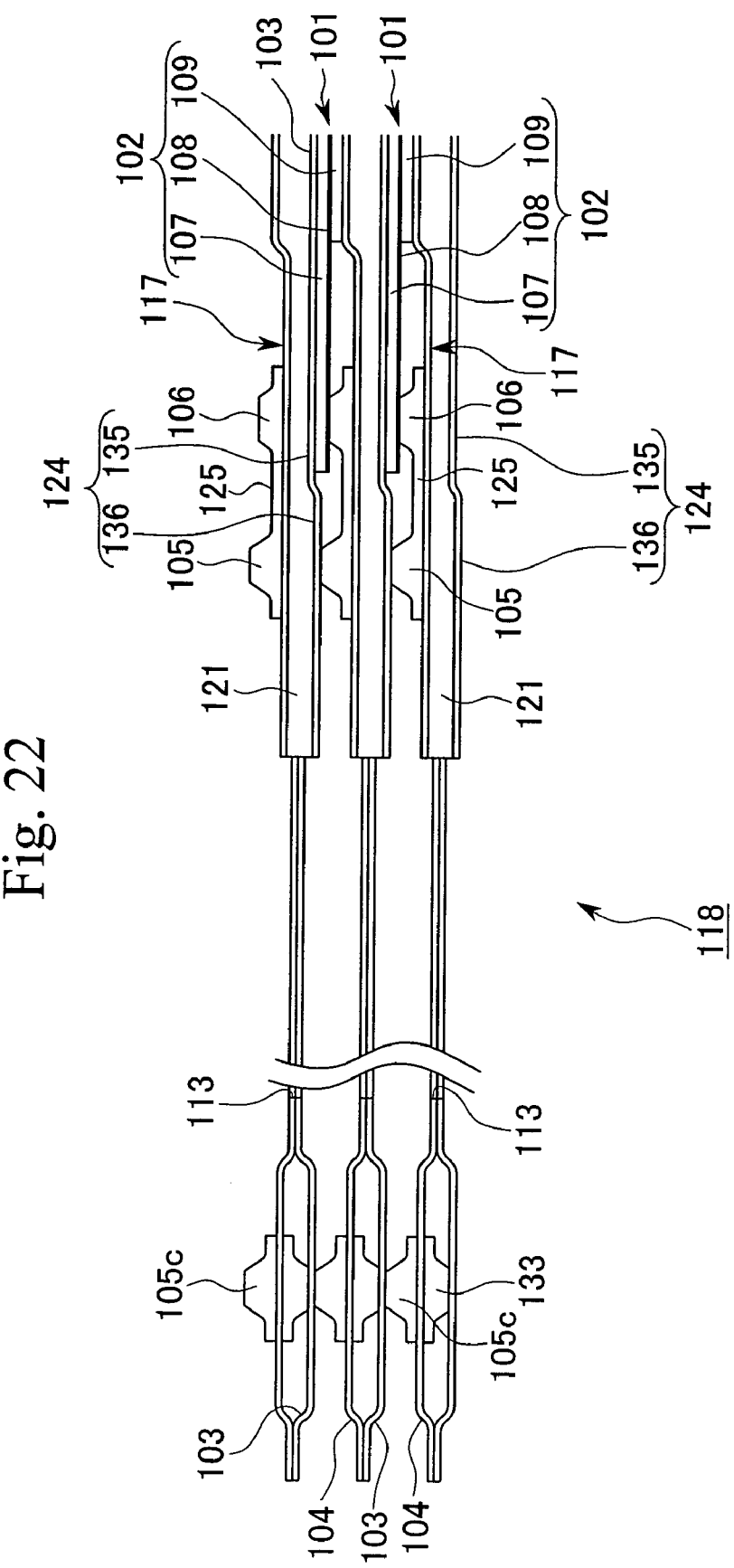
FIG. 22 is a longitudinal cross-sectional view of the vicinity of the cooling medium supply port in a fuel cell stack formed by stacking two fuel cells as shown in FIG. 17 taken along line C-C shown in FIG. 19.

In addition, in the fuel cell stack 118 composed by stacking fuel cells, a seal member 133 is disposed between the first separator 103 and second separator 104 of adjacent fuel cells 101 for defining the supply ports 111 and 112 and the exhaust ports 114 and 115 as well as the cooling medium passage 121 from the cooling medium supply port 113 to the cooling medium exhaust port 116 (see FIG. 22). This fuel cell-interposed seal member 133 is disposed on the rear surface of plane portion 117 disposed within the same plane by taking advantage of the fact that separators 103 and 104 are formed by press-forming steel plates.

The following provides an explanation of the operation and effects of fuel cell 101 and fuel cell stack 118 according to the present embodiment composed in the manner previously described.

In the fuel cell 101 according to the present embodiment, since one surface of the electrolyte membrane 108 that composes the electrode assembly 102 is supported by the anode electrode 107, electrolyte membrane 108 is not deformed and remains in place even if subjected to the pressure of inner seal member 106 that presses against said electrolyte membrane 108. Thus, in addition to the tightly sealed state between electrolyte membrane 108 and inner seal member 106 being maintained, electrode assembly 102 is held in a sound state without the application of force in the direction that causes separation of electrolyte membrane 108 from electrodes 107 and 109.

In the present embodiment, since a step is provided between inner plane portion 135 and outer plane portion 136, the difference between the height of inner seal member 106 and outer seal member 105 can be reduced. In particular, by making the level difference between inner plane portion 135 and outer plane portion 136 equal to the combined thickness of the thickness of anode electrode 107 and the thickness of electrolyte membrane 108, the heights of the cross-sections of both seal members 105 and 106 can be made the same. As a result, not only the cross-sectional height of inner seal member 106, but also that of outer seal member 105 can be made to be the minimum required height, thereby making it possible to conserve on the material that composes seal members 105 and 106 and in turn reduce costs.

Moreover, in the fuel cell 101 according to the present embodiment, the thickness between separators 103 and 104 can be reduced by the size of the step. This is because, in the case the thickness of seal member 133 disposed between fuel cells is made to have the minimum thickness, by further raising the inner plane portion 135 contacting the peripheral edge of anode electrode 107 (backing member) relative to the outer plane portion 136, the space itself between the first separator 103 and the second separator 104, which had been tightly sealed by outer seal member 105 having a thickness greater than required, can be reduced.

As a result, although passages 119 through 121 of each portion become narrower, these passages 119 through 121 themselves are able to ensure sufficient areas by adjusting the pitch and so forth of corrugated portion 110.

Namely, with the exception of the plate thickness of separators 103 and 104 considered to be required for strength or other reasons it can be said that the thickness of fuel cell 101 is determined by the thickness of outer seal member 105 and fuel cell-interposed seal member 133 disposed back-to-back on both sides of separators 103 and 104. Thus, since the thickness of outer seal member 105 can be reduced while maintaining the minimum thickness for fuel cell-interposed seal member 133, the thickness of fuel cell 101 can be reduced correspondingly.

In addition, since the rigidity of the separator 103 is enhanced by the providing of a step on said separator 103, the assembly quality when stacking fuel cells 101 is improved. As a result, the handling ease of fuel cell 102 can be improved. Moreover, since the contact surfaces with both seal members 105 and 106 on the separator 104 become flat, seal members 105 and 106 can be molded easily.

In addition, since the fuel cell stack 108 according to the present embodiment is composed by stacking a plurality of the fuel cells 101 having a reduced thickness as described above in the direction of thickness, the total thickness of the fuel cell stack 108 can be reduced by an amount corresponding to the reduced thickness of each fuel cell times the number of fuel cells stacked. Since the number of fuel cells stacked is, for example, about 100, this effect becomes enormous. Thus, installation space when installing fuel cell stack 118 in a vehicle can be reduced considerably.

Furthermore, although the anode electrode 107 is disposed as a backing member on the back of electrolyte membrane 108 that contacts inner seal member 106 in the present embodiment, the present invention is not limited to this.

For example, instead of anode electrode 107, cathode electrode 109 may be inserted between the first separator 103 and the inner seal member 106.

Figure 24:
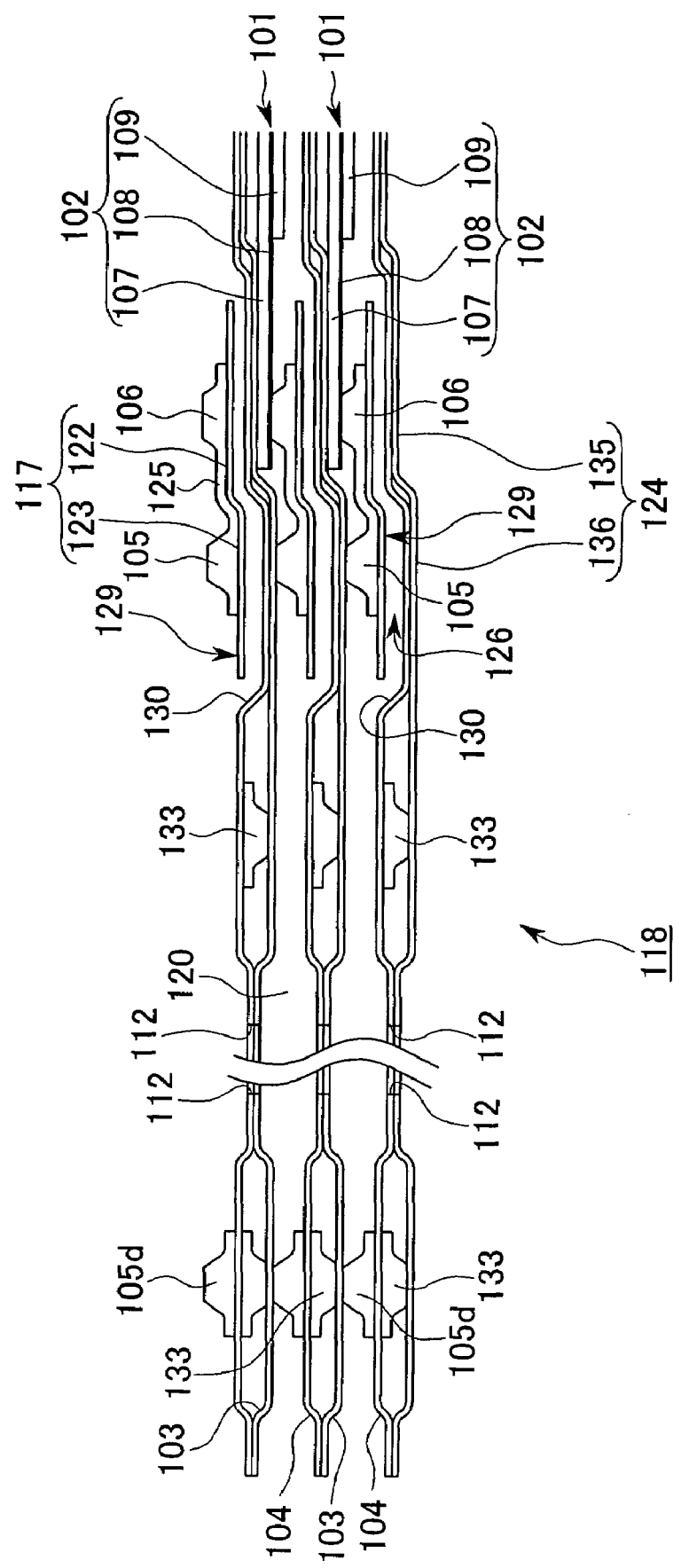
FIG. 24 is a longitudinal cross-sectional view showing the fourth embodiment of the present invention, which corresponds to FIG. 20 of the second embodiment.

Next, FIG. 24 shows a third embodiment according to the present invention that is a longitudinal cross-sectional view corresponding to FIG. 20 of the second embodiment. Furthermore, those members of the third embodiment that correspond to members of the second embodiment are indicated with the same reference symbols, and their explanations are omitted for the sake of convenience. The third embodiment differs from the second embodiment with respect to the presence of a step on not only the separator 103, but also on the separator 104. More specifically, there is a step on the contact surfaces with both seal members 105 and 106 of separator 104. Plane portion 117 of separator 104 is divided into an inner plane portion 122 that contacts inner seal member 106 and an outer plane portion 123 that contacts outer seal member 105. In addition, a step is similarly formed on the bridge member 129 in the same manner as separator 104, and is divided into inner plane portion 122 and outer plane portion 123. In this manner, as a result of forming a step not only on separator 103 but also on separator 104, in addition to the previously described operation and effects afforded by the first embodiment, since the rigidity of both separators 103 and 104 is improved the assembly quality when staking fuel cells 101 is further improved. In addition, since the orientation of the step of separator 104 is the same as the orientation of the step of separator 103, and inner plane portion 122 is formed to be higher than outer plane portion 123, the space between both separators 103 and 104 can be maintained nearly constant, thereby allowing reactive gas and cooling medium to circulate between these separators 103 and 104.

Figure 25:
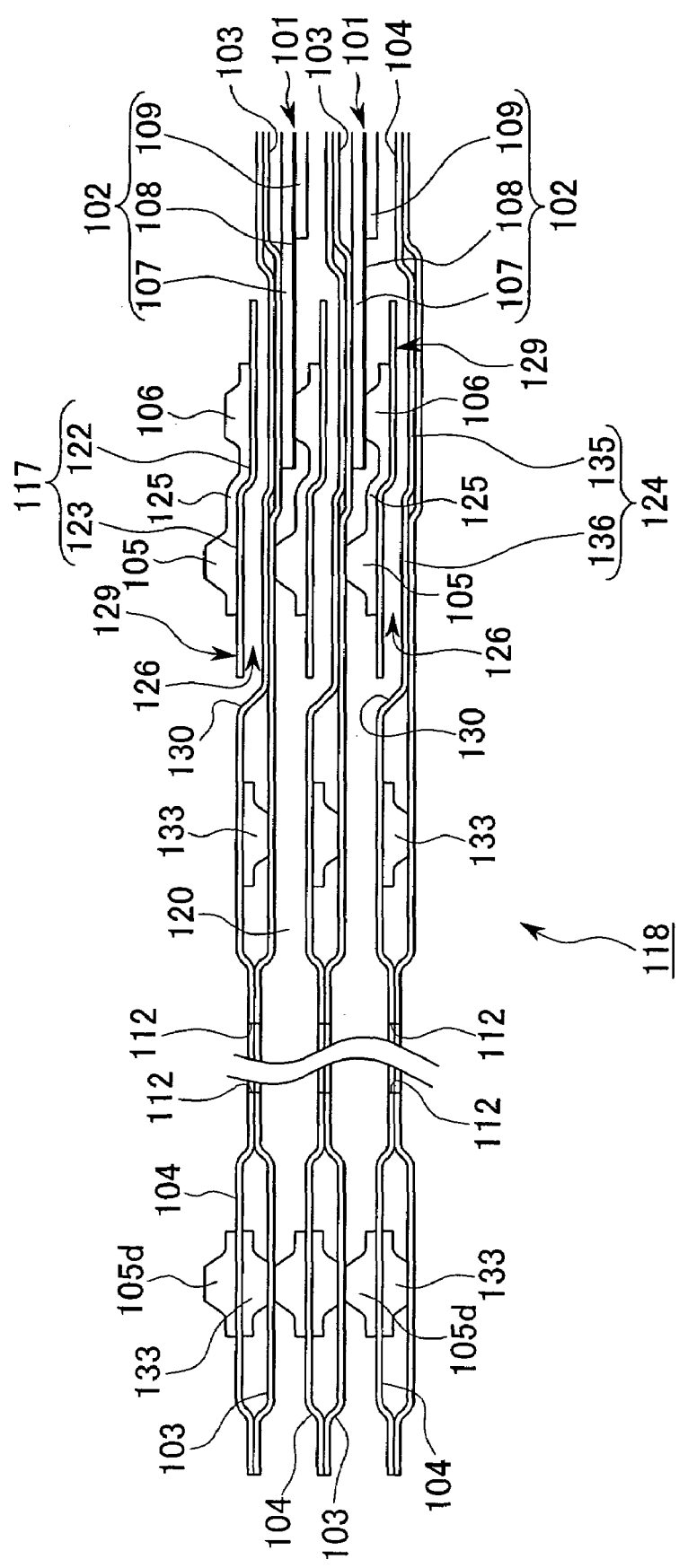
FIG. 25 is a longitudinal cross-sectional view showing the third embodiment of the present invention, which corresponds to FIG. 20 of the second embodiment of the present invention.

FIG. 25 shows a fourth embodiment of the present invention that is a longitudinal cross-sectional view corresponding to FIG. 20 of the first embodiment. In this third embodiment, although there are steps on both separators 103 and 104 in the same manner as the third embodiment, the orientations of these steps of separators 103 and 104 are opposite that of the third embodiment. More specifically, the steps on separators 103 and 104 are formed to as to become lower moving from the outside to the inside. As a result, the heights of outer plane portions 123 and 136 are greater than the heights of inner plane portions 122 and 135. Thus, in addition the operation and effects afforded by the first and second embodiments, the position of outer seal member 5 and the position of the backing member (the peripheral edge of anode electrode 107 in this case) can be made to overlap along the laminated direction of fuel cells 101, thereby making it possible to reduce the thickness of each fuel cell 101 by the amount of that overlap.

Figure 26:
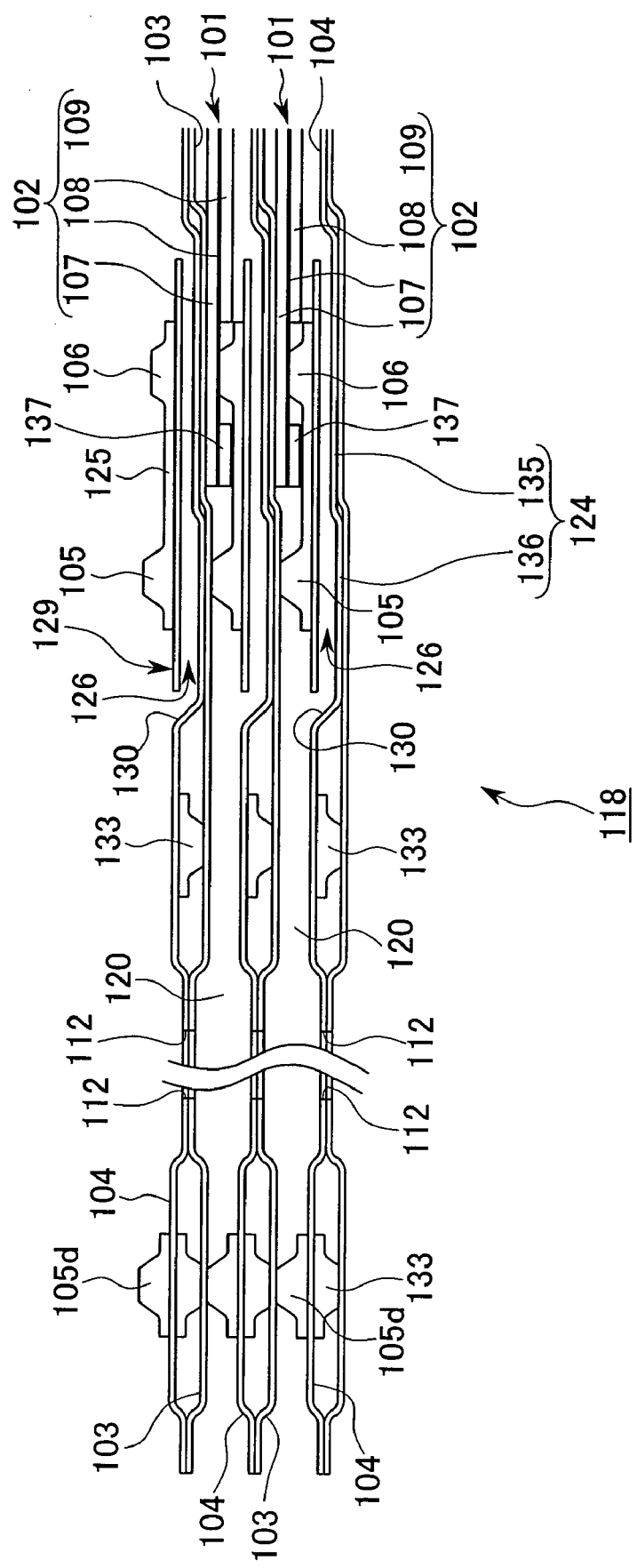
FIG. 26 is a longitudinal cross-sectional view showing the fifth embodiment of the present invention, which corresponds to FIG. 20 of the second embodiment.

FIG. 26 shows a fifth embodiment of the present invention that is a longitudinal cross-sectional view corresponding to FIG. 20 of the second embodiment. This fifth embodiment differs from the second embodiment only with respect to providing a reinforcing member 137 on not only separator 103, but also on separator 104. More specifically, a peripheral reinforcing member 137 on the surface of electrolyte membrane 108 that contacts cathode electrode 109 to the outside of the inner seal member 106. In this manner, by providing a reinforcing member on the surface of the electrolyte membrane 108 that contacts the inner seal member 106, in addition to the operation and effects afforded by the first embodiment, electrolyte membrane 108 can be further reinforced in the direction of thickness, thereby further improving durability with respect to stress. Furthermore, although the reinforcing member is composed with the same material as cathode electrode 109 in the present embodiment, the material of the reinforcing member is not limited to this, but rather can be changed to the use of a material such as plastic, rubber or carbon.

Figure 27:
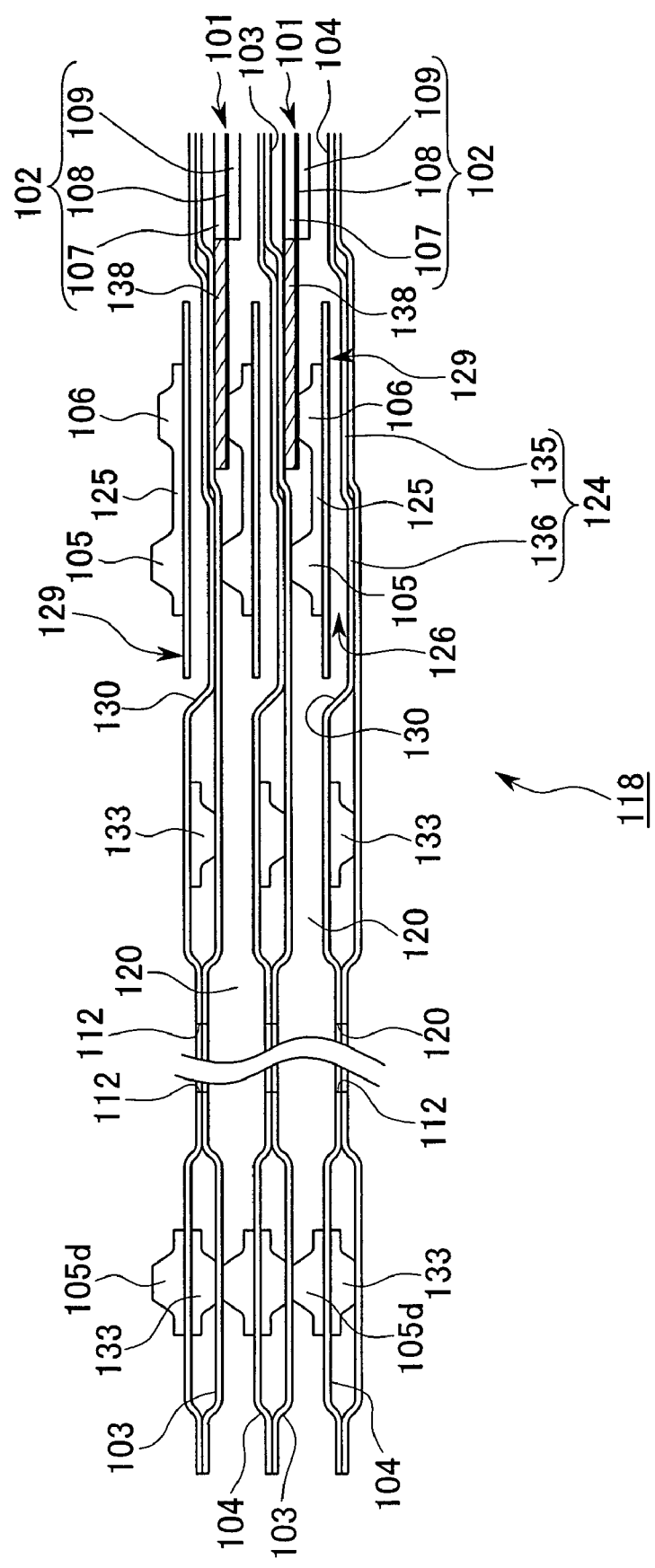
FIG. 27 is a longitudinal cross-sectional view showing the sixth embodiment of the present invention, which corresponds to FIG. 20 of the second embodiment.

FIG. 27 shows a sixth embodiment of the present invention that is a longitudinal cross-sectional view corresponding to FIG. 20 of the second embodiment. This sixth embodiment differs from the second embodiment with respect to the backing member 138 of the anode electrode 107 being formed from a different material than that of anode electrode 107. More specifically, together with the anode electrode 107 being formed to roughly the same size as the cathode electrode 109, a peripheral backing member 138 is provided on the outer periphery of anode electrode 107. In this manner, by forming the backing member 138 from a different material than that of anode electrode 107, in addition to the operation and effects afforded by the first embodiment, the cost of anode electrode 107 can be reduced and a stronger material can be selected, thereby making it possible to both reduce cost and improve durability. Furthermore, similar to the reinforcing member described above, examples of materials that can be used for backing member 138 include plastic, rubber and carbon.

Figure 28:
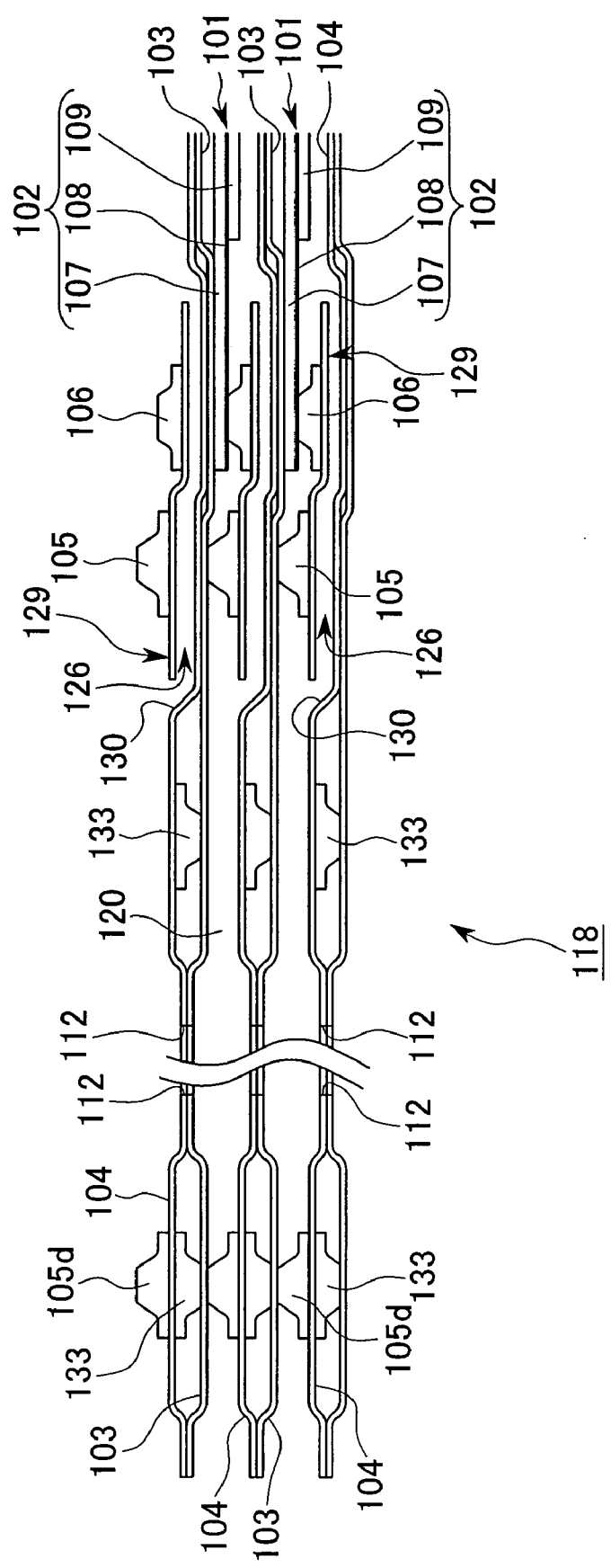
FIG. 28 is a longitudinal cross-sectional view showing the seventh embodiment of the present invention, which corresponds to FIG. 20 of the second embodiment.

FIG. 28 shows a seventh embodiment of the present invention that is a longitudinal cross-sectional view equivalent to FIG. 4 of the first embodiment. This seventh embodiment differs from the second embodiment with respect to the outer seal member 105 and the inner seal member 106 being separate members. More specifically, outer seal member 105 and inner seal member 106 are provided in a state in which they are separated from separator 104 and bridge member 106, respectively, so that together with outer seal member 105 being opposed to outer plane portion 136 of separator 103, inner seal member 106 is opposed to inner plane portion 135. As a result of outer seal member 105 and inner seal member 106 being in the form of separate members in this manner, in addition to the operation and effects afforded by the first embodiment, since outer seal member 105 and inner seal member 106 can be formed independently, the degree of freedom of handling is improved. In addition, since different materials can be used for outer seal member 105 and inner seal member 106, the optimum seal materials can be selected for each.

Figure 29:
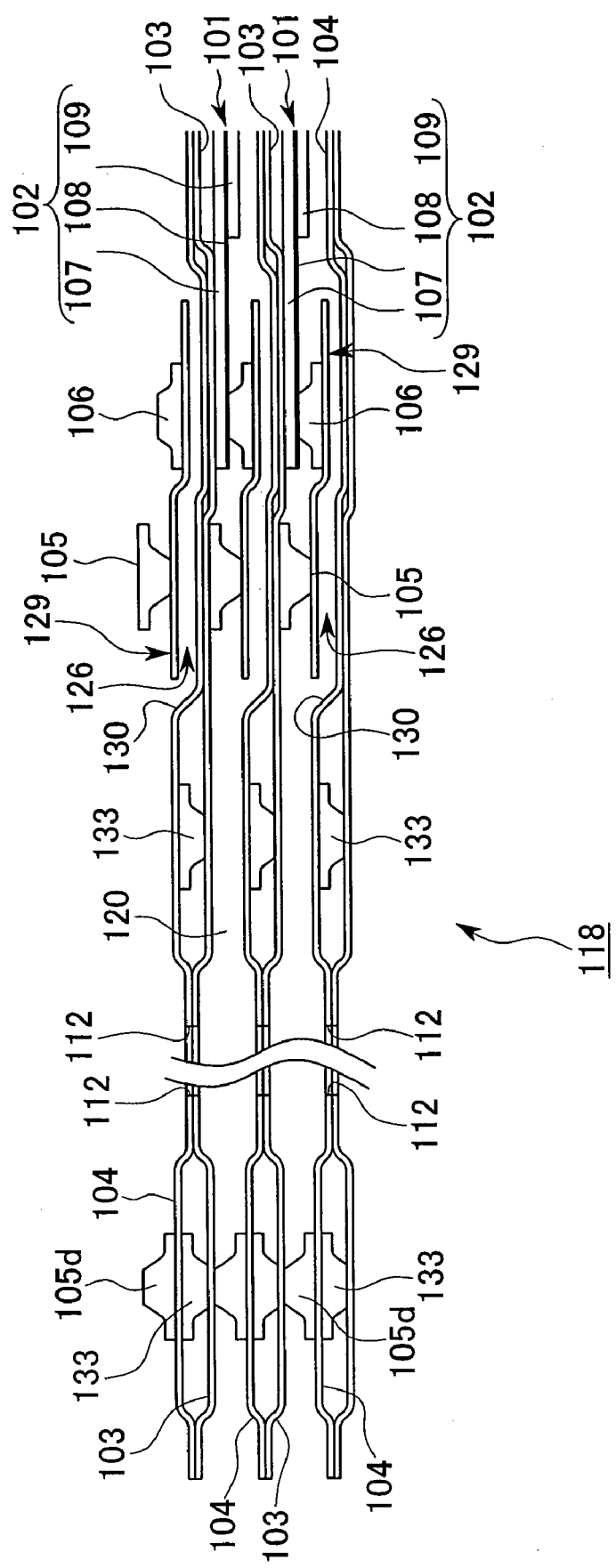
FIG. 29 is a longitudinal cross-sectional view showing the seventh embodiment of the present invention, which corresponds to the second embodiment.
Figure 30:
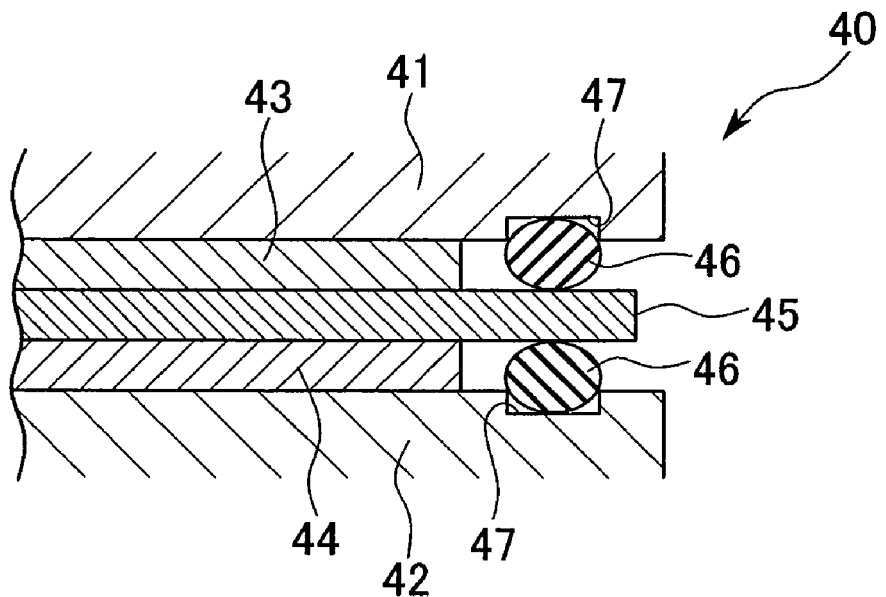
FIG. 30 is a longitudinal cross-sectional view explaining a sealing structure of a conventional fuel cell.
Figure 31:
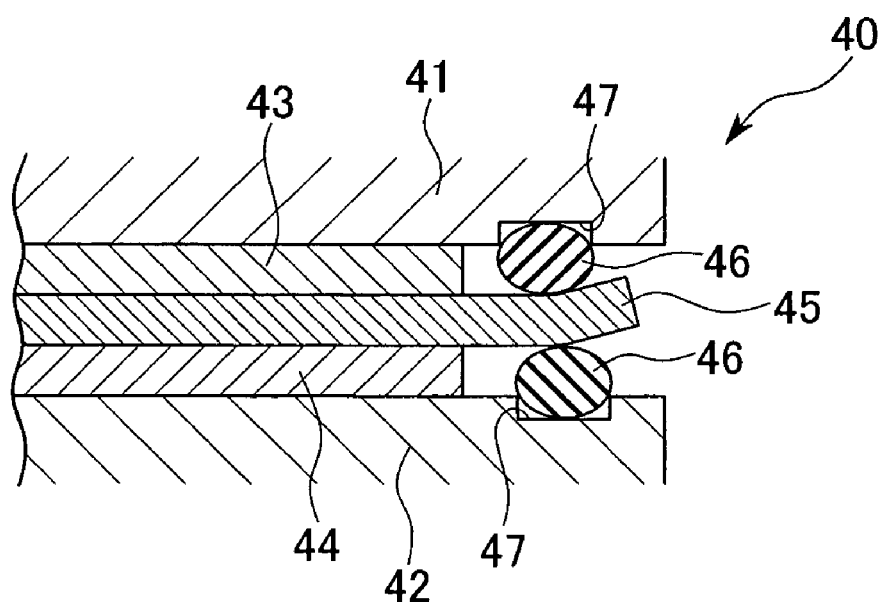
FIG. 31 is a longitudinal cross-sectional view showing the state in which the O-ring has shifted in the sealing structure of a conventional fuel cell.

FIG. 29 shows a eighth embodiment of the present invention that is a longitudinal cross-sectional view equivalent to FIG. 4 of the first embodiment. This eighth embodiment differs from the seventh embodiment with respect to outer seal member 105 and inner seal member 106 being formed on separate separators 103 and 104. More specifically, outer seal member 105 is formed on separator 104, while inner seal member 106 is formed on separator 103. As a result of forming outer seal member 105 and inner seal member 106 on separate separators 103 and 104 in this manner, similar to the sixth embodiment, outer seal member 105 and inner seal member 106 can be formed independently, thereby improving the degree of freedom of handling.

As has been described above, although various embodiments of the fuel cell and fuel cell stack of the present invention have been explained, the present invention is not limited to these embodiments, but rather various modifications can be made as described below. For example, although the case of forming a peripheral seal member for the cathode side diffusion layer 136 was explained, this may also be provided on the anode side diffusion layer.

In addition, although it was described in the embodiments that the level difference between inner plane portion 135 and outer plane portion 136 is preferably set to be equal to the sum of the thickness of anode electrode 107 and electrolyte membrane 108, it may be suitably adjusted instead for reasons such as securing passages 119 through 122 for oxidant gas, fuel gas, cooling medium and so forth.

In addition, seal members 105 and 106 may be adhered to the separators during assembly or they be integrally formed with the separators.

Moreover, although the separators are composed from metal plates, they may also be produced using a fine carbon material instead.

Moreover, the aforementioned embodiments may also be composed by suitably combining their contents.

As described above, the present invention according to the first embodiment exhibits the following effects.

The first aspect of the present invention provides a fuel cell, in which both side surfaces of the electrolyte membrane is not sandwiched by seal members, but one surface of the electrolyte membrane is provided with a backing member, so that the electrolyte membrane does not deform so that it is possible to define tightly sealed passages on both side surface of the membrane electrode assembly.

In addition, it is possible to reduce a step as the difference in the level between the space to be sealed by the inner seal member and the space to be sealed by the outer seal member. As a result, it is possible to optimize the thickness of respective seal members which results in reducing useless material cost, and reducing the interval between separators which results in reduction of the thickness of the fuel cell.

In the fuel cell according to the second aspect of the present invention, the anode electrode or the cathode electrode is used as the backing member, so that the above effects are obtained without increasing the number of constituting parts while reducing the product cost.

In the fuel cell according to the third aspect of the present invention, the backing member is formed by the other separator, it is possible to reduce an anode electrode or a cathode electrode, which does not contribute to power generation and to further reduce the product cost further. In particular, since the separator is formed by, for example, press forming a metal plate, the shape of the separator may be freely modified and the separator is a preferable element for use as the backing member of the electrolyte membrane.

Since a fuel cell stack according to the fourth aspect of the present invention is formed by stacking a plurality of the fuel cells according to first to fourth aspect, whose thickness is reduced as described above, the total thickness can be reduced by an amount corresponding to the reduced thickness for a fuel cell times the number of fuel cell units of the fuel cell stack. Accordingly, it is possible to reduce the setting space of the fuel cell stack when it is loaded in a vehicle.

Since the fuel cell according to the tenth aspect comprises a step whose height is the same as that of the total thickness of the electrolyte membrane and the thicker electrode among a pair of electrode, the total thickness of the fuel cell can be reduced.

Furthermore, the fuel cell of the present invention according to embodiments from the second to the eighth embodiment exhibit the following effects.

In the fuel cell according to the eleventh aspect, the amount of material used to compose the seal members can be decreased, and costs can be reduced. In addition, since the thickness of the outer seal member can be reduced while maintaining the thickness of the inner seal member, the thickness of the fuel cell can be reduced. Since the rigidity of the separators provided with the steps can be increased, the assembly quality when stacking the fuel cells can be improved.

Since the assembly quality when stacking the fuel cells can be further improved as shown in the twelfth aspect, and since the space between the two separators can be maintained nearly constant, reactive gas and cooling medium is able to circulate smoothly between them.

In the fuel cell according to the thirteenth aspect the electrolyte membrane can be further reinforced in the direction of thickness, thereby further improving the durability with respect to stress.

According to the fourteenth aspect, the number of parts can be decreased and the product cost can be reduced.

According to the fifteenth aspect, the number of parts can be decreased and production time can be shortened.

Since the fuel cell according to the sixteenth or seventeenth aspects of the present invention, the outer seal member and the inner seal member can be formed independently, thereby improving the degree of freedom of handling.

According to the fuel cell stack of the eighteenth aspect of the present invention, the assembly quality of the fuel cell stack is improved. In addition, the number of composite materials of the seal members can be decreased and costs can be reduced.

What is claimed is:

1. A fuel cell comprising:
an electrode assembly sandwiched between a first separator having an inner surface and a second separator having an inner surface, the electrode assembly being composed of an electrolyte membrane sandwiched between an anode electrode and a cathode electrode;
an outer seal member sandwiched between the first and second separators at a position surrounding an outer periphery of the electrode assembly, wherein the outer seal member contacts the inner surface of both of the first and second separators;
an inner seal member sandwiched between the first separators and the electrolyte membrane, wherein the electrolyte membrane has a first outer surface that faces the inner surface of the first separator and an opposed second outer surface that faces the inner surface of the second separator, wherein the inner seal member contacts the inner surface of the first separator and the first outer surface of the electrolyte membrane; and
a backing member sandwiched between the second separator and the electrolyte membrane, wherein the backing member contacts the inner surface of the second separator and the second outer surface of the electrolyte membrane;
wherein, there is a step formed on the second separator at a position located between the outer seal member and the backing member contact the inner surface of the second separator.

2. A fuel cell according to claim 1, wherein there is a step in the same direction as the step of the other separator on the contact surfaces with both seal members on one of separators.

3. A fuel cell according to claim 1, further comprising:
a backing member for supporting said electrolyte member placed opposing said inner seal member interposing said electrolyte membrane.

4. A fuel cell according to claim 1, wherein the backing member is an anode electrode or a cathode electrode.

5. A fuel cell according to claim 1, wherein the inner seal member and the outer seal member constitute an integral member.

6. A fuel cell according to claim 1, wherein the outer seal member and the inner seal member are separate members.

7. A fuel cell according to claim 6, wherein the outer seal member and the inner seal member are provided on different separators.

8. A fuel cell stack, which is formed by stacking a plurality of the fuel cells according to claim 1.

9. A fuel cell according to claim 1, wherein the inner seal member contacts the electrolyte membrane at a first contact portion and the backing member contacts the electrolyte membrane at a second contact portion, wherein the backing member and the inner seal member are disposed in registration in a stacking direction of the fuel cell such that the first and second contact portions are aligned along an axis that extends in the stacking direction.

10. A fuel cell according to claim 1, wherein the outer seal member is a single unitary member that spans between the first and second separators.

11. A fuel cell according to claim 1, wherein the first and second separators are separated from each other a first distance at a location where the outer seal member contacts the inner surface of both of the first and second separators, and the first and second separators are separated from each other a second distance at a location where the backing member contacts the inner surface of the second separator, wherein the second distance is greater than the first distance.

* * * * *